(12) United States Patent
Kim et al.

(10) Patent No.: US 12,323,721 B2
(45) Date of Patent: Jun. 3, 2025

(54) IMAGE SENSOR

(71) Applicant: Samsung Electronics Co., Ltd., Suwon-si (KR)

(72) Inventors: Myeongeon Kim, Suwon-si (KR); Eun Sub Shim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 129 days.

(21) Appl. No.: 18/315,841

(22) Filed: May 11, 2023

(65) Prior Publication Data
US 2024/0129649 A1    Apr. 18, 2024

(30) Foreign Application Priority Data

Oct. 18, 2022    (KR) .......................... 10-2022-0134336

(51) Int. Cl.
*H04N 25/77*    (2023.01)
*H04N 25/704*   (2023.01)
*H04N 25/771*   (2023.01)
*H04N 25/778*   (2023.01)

(52) U.S. Cl.
CPC .................... *H04N 25/77* (2023.01)

(58) Field of Classification Search
CPC ...... H04N 25/77; H04N 25/59; H04N 25/704; H04N 25/75; H04N 25/771; H04N 25/772; H04N 25/778; H10F 39/32; H10F 39/803

See application file for complete search history.

(56) References Cited

U.S. PATENT DOCUMENTS

| | | | |
|---|---|---|---|
| 9,967,504 B1* | 5/2018 | Manabe | H10F 39/18 |
| 10,110,783 B2* | 10/2018 | Webster | H04N 25/771 |
| 11,330,203 B2 | 5/2022 | Kumagai et al. | |
| 2011/0036969 A1* | 2/2011 | Ahn | H10F 39/803 |
| | | | 250/208.1 |
| 2017/0207263 A1 | 7/2017 | Park et al. | |
| 2020/0235150 A1 | 7/2020 | Yamashita | |
| 2021/0029318 A1* | 1/2021 | Lee | H10F 39/808 |
| 2021/0289154 A1 | 9/2021 | Johnson et al. | |
| 2022/0060647 A1 | 2/2022 | Lee et al. | |
| 2022/0078362 A1 | 3/2022 | Jung et al. | |
| 2022/0094864 A1 | 3/2022 | Lee et al. | |

FOREIGN PATENT DOCUMENTS

| | | |
|---|---|---|
| JP | 2022-043846 A | 3/2022 |
| KR | 10-2022-0033298 A | 3/2022 |

* cited by examiner

*Primary Examiner* — Marly S Camargo
(74) *Attorney, Agent, or Firm* — Harness, Dickey & Pierce, P.L.C.

(57) ABSTRACT

An example embodiment provides an image sensor including: a pixel array including a first floating diffusion and a second floating diffusion, the first floating diffusion and the second floating diffusion configured to store charges generated by a first phase detecting pixel and a second phase detecting pixel adjacent to each other in a first direction and covered with one micro lens, and the pixel array is configured to output a first signal based on a charge that is generated by the first phase detecting pixel to be accumulated in the first floating diffusion and the second floating diffusion; and a row driver configured to apply a boosting control signal to the second floating diffusion to transfer charges stored in the second floating diffusion to the first floating diffusion, after the pixel array outputs the first signal.

20 Claims, 20 Drawing Sheets

IMAGE SENSOR

CROSS-REFERENCE TO RELATED APPLICATION

This application claims priority to and the benefit of Korean Patent Application No. 10-2022-0134336 filed in the Korean Intellectual Property Office on Oct. 18, 2022, the contents of which are incorporated herein by reference in their entirety.

BACKGROUND

(a) Field

Example embodiments disclosed herein relate to image sensors.

(b) Description of the Related Art

An image sensor is a device that captures a two-dimensional or three-dimensional image of an object. An image sensor generates an image of an object by using a photoelectric conversion element that reacts according to intensity of light reflected from the object.

Recently, the demand for image sensors with improved performance in various fields is increasing. A complementary metal-oxide semiconductor (CMOS) image sensor is an image imaging element manufactured using the CMOS process, and it has a low manufacturing cost, low power consumption, and high integration compared to a charge-coupled device (CCD) image sensor.

SUMMARY

An example embodiment provides an image sensor including a pixel that may provide an increased auto-focus range for an object.

An example embodiment provides an image sensor including a pixel that may provide an improved auto-focus function.

An example embodiment provides an image sensor including: a pixel array including a first floating diffusion and a second floating diffusion, the first floating diffusion and the second floating diffusion configured to store charges generated by a first phase detecting pixel and a second phase detecting pixel, the first phase detecting pixel and the second phase detecting pixel adjacent to each other in a first direction and covered with one micro lens, and the pixel array is configured to output a first signal based on a charge that is generated by the first phase detecting pixel to be accumulated in the first floating diffusion and the second floating diffusion; and a row driver configured to apply a boosting control signal to the second floating diffusion to transfer charges stored in the second floating diffusion to the first floating diffusion, after the pixel array outputs the first signal.

Another example embodiment provides a pixel including: a first phase detecting pixel connected to a first node; a second phase detecting pixel connected to a first node and disposed adjacent to the first phase detecting pixel; a first floating diffusion configured to determine a voltage of the first node based on charges generated by the first phase detecting pixel and the second phase detecting pixel; a second floating diffusion connected to the first node; and a driving transistor configured to receive a control signal such that the driving transistor sequentially outputs a first signal based on a charge generated by the first phase detecting pixel to be accumulated in the first floating diffusion, a second signal based on a charge generated by the first phase detecting pixel to be accumulated in the first floating diffusion and the second floating diffusion, and a third signal based on charges generated by the first phase detecting pixel and the second phase detecting pixel to be accumulated in the first floating diffusion.

Another example embodiment provides an image sensor including: a semiconductor substrate in which a plurality of pixel areas are defined; a first photoelectric element provided inside the semiconductor substrate in each of the plurality of pixel areas, and a second photoelectric element adjacent to the first photoelectric element; a first transmission transistor having a transmission gate electrode having at least a partial area buried in the semiconductor substrate and the transmission gate electrode extending in a direction perpendicular to the first photoelectric element; a second transmission transistor having a transmission gate electrode having at least a partial area buried in the semiconductor substrate to extend in a direction perpendicular to the second photoelectric element; a first floating diffusion configured to accumulate charges transferred from the first photoelectric element and the second photoelectric element via the first transmission transistor and the second transmission transistor; and a second floating diffusion including a silicon layer, and an electrode positioned on the silicon layer and configured to receive boosting control signal, and that transfers charges transferred from the first photoelectric element and the second photoelectric element to the first floating diffusion in response to the boosting control signal being applied.

DETAILED DESCRIPTION OF THE EXAMPLE EMBODIMENTS

Figure 1:
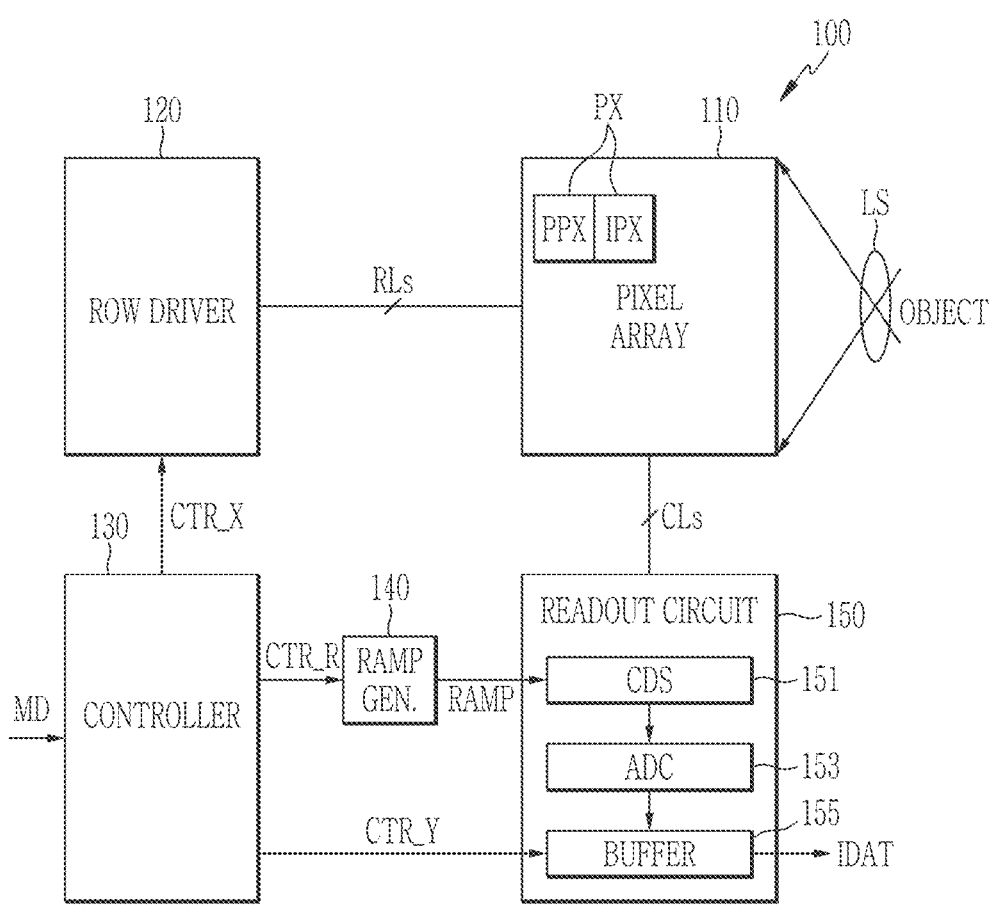
FIG. 1 illustrates a block diagram of an image sensor according to an example embodiment.

Hereinafter, the present invention will be described more fully hereinafter with reference to the accompanying drawings, in which example embodiments of the invention are shown. As those skilled in the art would realize, the described example embodiments may be modified in various different ways, all without departing from the spirit or scope of the present invention.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

In addition, a singular form may be intended to include a plural form as well, unless the explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

FIG. 1 illustrates a block diagram of an image sensor according to an example embodiment.

Referring to FIG. 1, an image sensor 100 may include a lens LS, a pixel array 110, a row driver 120, a controller 130, a ramp signal generator 140, and a readout circuit 150. Although not shown in FIG. 1, the image sensor 100 may further include a clock signal generator, a signal processor, a column decoder, and/or a memory.

The image sensor 100 may convert an optical signal of an object (OBJECT) incident through an optical device into an electrical signal, and may generate image data IDAT based on the converted electrical signal. The optical device may be an optical collection device including a mirror and the lens LS. For example, the image sensor 100 may use an optical device capable of condensing various paths of light reflected by the object (OBJECT) by using optical characteristics such as dispersion or refraction of light, or changing a movement path of light. In the present disclosure, for better understanding and ease of description, it is described that the lens LS is used, but the present disclosure is not limited thereto, and the image sensor 100 may use various optical devices.

The image sensor 100 may be mounted on an electronic device having an image or optical sensing function. For example, the image sensor 100 may be mounted on an electronic device such as a camera, a smartphone, a wearable device, an Internet of things (IoT) device, a home appliance, a tablet personal computer (PC), a personal digital assistant (PDA), a portable multimedia player (PMP), a navigation device, a drone, an advanced driver assistance systems (ADAS), and the like. In addition, the image sensor 100 may be mounted on an electronic device provided as a component in a vehicle, furniture, a manufacturing facility, a door, various measurement devices, or the like.

The pixel array 110 may be a complementary metal oxide semiconductor image sensor (CIS) that converts an optical signal into an electrical signal. The optical signal passing through the lens LS may reach a light receiving surface of the pixel array 110 to form an image of a subject. The pixel array 110 may adjust sensitivity of the optical signal under the control of the controller 130.

The pixel array 110 may include a plurality of pixels PX, and a plurality of row lines RL and a plurality of column lines CL respectively connected to the plurality of pixels PX.

The row line RL extends in a first direction, and may be connected to the pixels PX disposed along the first direction. For example, the row line RL may transmit a control signal outputted from the row driver 120 to an element included in the pixel PX, for example, a transistor. The column line CL extends in a second direction crossing the first direction, and may be connected to the pixels PX disposed along the second direction. The column line CL may transmit a pixel signal outputted from the pixels PX to the readout circuit 150.

In some example embodiments, each pixel PX may include at least one photoelectric element. The photoelectric element may sense incident light, and may convert the incident light into an electrical signal according to an amount of the light, that is, a plurality of analog pixel signals. For example, the pixel array 110 may be implemented as a photoelectric element such as a charge coupled device (CCD) or a complementary metal oxide semiconductor (CMOS), and may be implemented with various types of photoelectric elements.

In some example embodiments, each pixel PX may include at least one photoelectric element (also referred to as a photo-sensing element). The photoelectric element may sense incident light, and may convert the incident light into an electrical signal according to an amount of the light, that is, a plurality of analog pixel signals. The level of the analog pixel signal outputted from the photoelectric element may be proportional to an amount of charge outputted from the photoelectric element. That is, the level of the analog pixel signal outputted from the photoelectric element may be proportional to an amount of light received into the pixel array 110.

In addition, the pixel array 110 may adjust a conversion gain (CG) in a process of generating a plurality of analog pixel signals. The conversion gain is a magnitude of an analog pixel signal outputted from the pixel array 110 for a unit photo-charge generated by photoelectric conversion. Here, the conversion gain may be adjusted by changing FD capacitance by using a plurality of transistors included in one pixel in the pixel array 110.

The pixel PX may include a plurality of image sensing pixels IPX and a plurality of phase detecting pixels PPX.

The plurality of image sensing pixels IPX may generate image signals corresponding to the object (OBJECT). The plurality of phase detecting pixels PPX may not only generate an image signal corresponding to the object (OBJECT), but may further generate phase signals used to focus on the object (OBJECT). The phase signals may include information on positions of an image corresponding to the object (OBJECT) incident through an optical device. An image signal and a phase signal generated by the plurality of image sensing pixels IPX and the plurality of phase detecting pixels PPX may be transmitted to the readout circuit 150 through the column line CL. The readout circuit 150 may calculate a phase differences between images through the phase signal.

A color filter and a micro lens may be stacked on each of the plurality of image sensing pixels IPX and the plurality of phase detecting pixels PPX. The color filter may transmit light of a specific color, that is, a wavelength of a specific color area, among light incident through the micro lens. The color filter may include red, green, and blue filters. A color detectable by the pixel PX may be determined according to a color filter provided in the plurality of image sensing pixels IPX and the plurality of phase detecting pixels PPX. However, the present invention is not limited thereto, and the photoelectric element in the pixel PX may convert light corresponding to a wavelength of a specific color area into an electrical signal according to a level (for example, a voltage level) of an applied electrical signal. That is, the color detectable by the pixel PX may be determined according to the level of the electrical signal applied to the photoelectric element.

Meanwhile, since one micro-lens is disposed on two phase detecting pixels PPX positioned to be adjacent to each other, light may be refracted and inputted to each phase detecting pixel PPX. When two phase detecting pixels are positioned adjacent to each other on the left and right, a first phase detecting pixel may generate a first phase signal by sensing a left side image of the object (OBJECT), and a second phase detecting pixel may generate a second phase signal by sensing a right side image of the object (OBJECT). The charge generated by the first phase detecting pixel and the charge generated by the second phase detecting pixel may be accumulated in the same floating diffusion.

As will be described later, a pixel signal outputted from the phase detecting pixel PPX in the pixel array 110 may be read by a pixel circuit including two floating diffusions. For example, it is assumed that the pixel circuit includes a first floating diffusion and a second floating diffusion. In this case, the pixel array 110 may output a first signal that is generated by the first phase detecting pixel and is based on the charge accumulated in the first floating diffusion, a second signal that is generated by the first phase detecting pixel and is based on the charge accumulated in the first floating diffusion and the second floating diffusion, a third signal that is generated by the first phase detecting pixel and the second phase detecting pixel and is based on the charge accumulated in the first floating diffusion, and a fourth signal that is generated by the first phase detecting pixel and the second phase detecting pixel and based on the charge accumulated in the first floating diffusion and the second floating diffusion.

The row driver 120 may generate a control signal for driving the pixel array 110 in response to the control of the controller 130 (for example, a row control signal CTR_X), and may provide the control signal to the plurality of pixels PX of the pixel array 110 through the plurality of row lines RL. For example, the control signal may include a signal for adjusting a conversion gain. In some example embodiments, the row driver 120 may control the pixel PX to sense incident light in a row line unit. The row line unit may include at least one row line.

In addition, the row driver 120 may select pixels in a row line unit among the plurality of pixels PX, may reset the pixels by providing a reset signal to the selected pixels (for example, pixels arranged in one row), and may control a voltage generated by the selected pixels to be outputted through the plurality of column lines CLs. Here, the resetting of the pixel PX means removing an electrical signal (for example, a voltage) generated by a photoelectric element in the pixel PX.

In some example embodiments, the row driver 120 may apply a boosting control signal to the pixel array 110 to adjust a voltage of the floating diffusion positioned in the pixel array 110. For example, the row driver 120 may apply a high-level boosting control signal to the pixel array 110, and after the pixel array 110 outputs a third signal, it may apply a low-level boosting control signal to the pixel array 110.

The controller 130 may generally control each of the constituent elements 110, 120, 140, and 150 included in the image sensor 100. The controller 130 may control an operation timing of each of the constituent elements 110, 120, 140, and 150 by using control signals. For example, the controller 130 may provide the row control signal CTR_X to the row driver 120, and the row driver 120 may control the pixel array 110 to be sensed in row line unit through the row line RL-based on the row control signal CTR_X. For example, the controller 130 may provide a ramp control signal CTR_R for controlling a ramp signal to the ramp generator 140, and the ramp generator 140 may generate a reference signal RAMP for an operation of the readout circuit 150 based on the ramp control signal CTR_R. For example, the controller 130 may provide a column control signal CTR_Y to the readout circuit 150, and the readout circuit 150 may receive and process a pixel signal from the pixel array 110 through the column lines CL based on the column control signal CTR_Y.

In some example embodiments, the controller 130 may generally control the image sensor 100 based on a mode signal.

Specifically, the controller 130 may control the ramp generator 140 to adjust the reference signal RAMP generated by the ramp generator 140, and may control the timing generator 120 to adjust floating diffusion (FD) capacitance of the pixel circuit in the pixel array 110 through the row driver 120.

The controller 130 may be implemented as a processing circuit such as hardware including a logic circuit, or may be implemented as a combination of hardware and software, such as a processor executing software that performs a compression operation. Particularly, the controller 130 may be implemented as a central processing unit (CPU), an arithmetic logic unit (ALU) that performs arithmetic and logic operations, bit shift, and the like, a digital signal processor (DSP), a microprocessor, an application specific integrated circuit (ASIC), a control logic, and the like that are included in the image sensor 100, but is not limited thereto, and it may further use an accelerator using an assistant to an artificial neural network or the like or an artificial neural network itself, a neural processing unit (NPU), and the like.

The ramp signal generator 140 may generate the reference signal RAMP including a plurality of ramp signals having a predetermined (or alternatively, desired) slope and gradually increasing or decreasing to provide it to the readout circuit 150. For example, the ramp signal generator 140 may operate according to a control signal CTR_R such as a ramp enable signal and a mode signal. The ramp signal generator 140 may generate the reference signal RAMP having a slope set based on the mode signal in response to the ramp enable signal.

Specifically, the ramp signal generator 140 may include a current source, a resistor, and a capacitor. The ramp signal generator 140 adjusts a ramp voltage, which is a voltage applied to a ramp resistor, by adjusting a current amount of a variable current source or a resistance value of a variable resistor, so that the ramp signal generator 140 may generate a plurality of ramp signals that fall or rise with a slope determined according to the current amount of the variable current source or the resistance value of the variable resistor. For example, the reference signal RAMP may have a waveform that is maintained at a constant voltage, is lowered with the determined slope, and is returned to the constant voltage.

The readout circuit 150 may convert a pixel signal (or an electrical signal) from the pixels PXs connected to the row line RL selected from the plurality of pixels PX according to the control from the controller 130 into a pixel value indicating an amount of light. The readout circuit 150 may process the pixel signal outputted through the corresponding column line CL to output it as the image data IDAT. The readout circuit 150 may include a correlated double sampling (CDS) circuit 151, an analog-to-digital converter (ADC) circuit 153, and a buffer 155.

The correlated double sampling circuit 151 may include a plurality of comparators, and each of (or alternatively, at least one of) the comparators may compare the pixel signal received from the pixel array 110 through the plurality of column lines CL with the reference signal RAMP from the ramp generator 140. Specifically, the correlated double sampling circuit 151 may compare the received pixel signal with the reference signal RAMP to output the compared result to the analog-to-digital converter circuit 153.

The plurality of pixel signals outputted from the plurality of pixels PX may have a deviation due to a unique characteristic (for example, a fixed pattern noise FPN) of each pixel and/or a deviation due to a difference in characteristics of a pixel circuit (for example, transistors for outputting a charge stored in the photoelectric element within the pixel) for outputting the pixel signal from the pixel PX. In order to compensate for the deviation between the plurality of pixel signals outputted through the plurality of column lines CL, obtaining a reset component (for example, a reset voltage) and a sensing component (for example, a sensing voltage) with respect to a pixel signal and extracting a difference therebetween (for example a difference between the reset voltage and the sensing voltage) as an effective signal component is called correlated double sampling. The correlated double sampling circuit 151 may output a comparison result to which a correlated double sampling method is applied to the received pixel signal.

The analog-to-digital converter circuit 153 converts the comparison result of the correlated double sampling circuit 151 into digital data, thereby generating and outputting pixel values corresponding to a plurality of pixels in row units. The analog-to-digital converter circuit 153 may include a plurality of counters. The counter may be implemented as an up-counter in which a count value is sequentially increased based on a counting clock signal, and an arithmetic circuit; or an up/down counter; or a bit-wise inversion counter. A plurality of counters may be connected to output terminals of a plurality of comparators, respectively. Each of (or alternatively, at least one of) the plurality of counters may count a comparison result outputted from a corresponding comparator to output digital data (for example, a pixel value) according to the counted result.

The buffer 155 may store a pixel value outputted from the analog-to-digital converter circuit 153, respectively. The buffer 155 may store digital data for each row. In some example embodiments, the buffer 155 may temporarily store a plurality of digital data outputted from the counter, then amplify and output them. That is, the buffer 155 may be an output buffer. The buffer 155 may output the image data DAT amplified based on the column control signal CTR_Y of the controller 130 to the outside.

The buffer 155 may be implemented as a static random access memory (SRAM), a latch, a flip-flop, or a combination thereof, but is not limited thereto. In some example embodiments, the buffer 155 may be included in the analog-to-digital converter circuit 153 as a memory.

In some example embodiments, the image sensor 100 may support an auto focusing (AF) function. The image sensor 100 may perform automatic focus detection by using phase difference AF technology. The phase difference AF is a method of focusing on the object OBJECT by sensing a disparity of a phase of an image formed on the image sensor 100. Specifically, the CDS circuit 151 may receive a phase signal from the pixel array 110 to perform a phase difference operation. For example, the CDS circuit 151 may perform a correlated double sampling operation on the phase signal received from the phase detecting pixel PPX to obtain a focus position, a focus direction, or a distance between the object OBJECT and the image sensor 100. Thereafter, the controller 130 may output a control signal for moving the position of the lens LS based on the result of the correlated double sampling operation.

Figure 2:
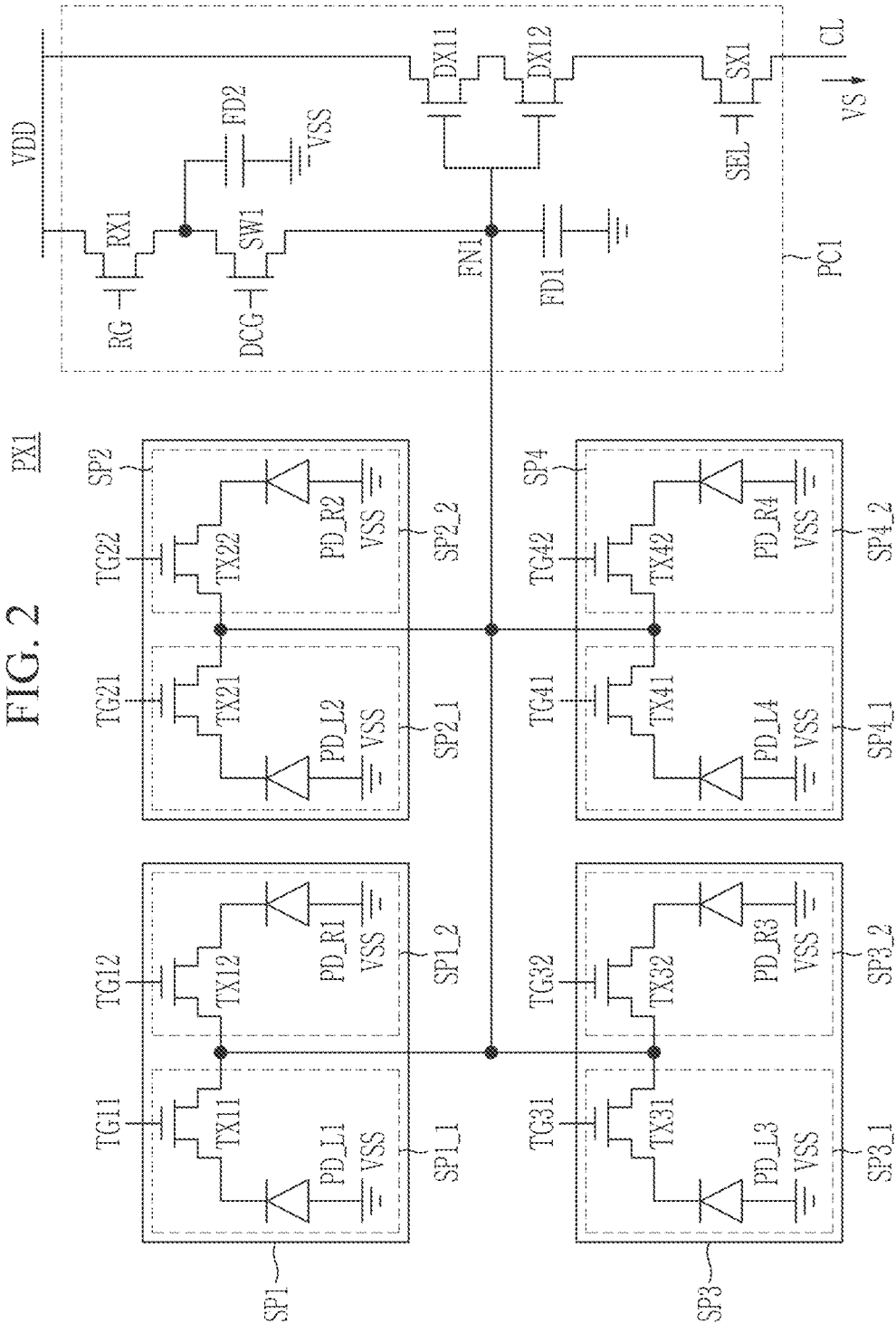
FIG. 2 illustrates a circuit diagram of a pixel according to an example embodiment.

FIG. 2 illustrates a circuit diagram of a pixel according to an example embodiment.

Referring to FIG. 2, a pixel PX1 may include a first sub-pixel SP1, a second sub-pixel SP2, a third sub-pixel SP3, and a fourth sub-pixel SP4.

First to fourth sub-pixels SP1 to SP4 may be arranged in rows and columns inside a pixel PX1. The first sub-pixel SP1 and the second sub-pixel SP2 may be positioned in the same row. The third sub-pixel SP3 and the fourth sub-pixel SP4 may be positioned in the same row. The first sub-pixel SP1 and the third sub-pixel SP3 may be positioned in the same column. The second sub-pixel SP2 and the fourth sub-pixel SP4 may be positioned in the same column.

The first to fourth sub-pixels SP1 to SP4 may be commonly connected to a floating node FN1. Each of the first to fourth sub-pixels SP1 to SP4 may include a first area and a second area.

The first sub-pixel SP1 may include a first area SP1_1 and a second area SP1_2. The first area SP1_1 may include a photoelectric element PD_L1 and a transmission transistor TX11. The transmission transistor TX11 is connected between the photoelectric element PD_L1 and the floating node FN1, and may be controlled by a transmission signal TG11. When the transmission transistor TX11 is turned on, a cathode of the photoelectric element PD_L1 is connected to the floating node FN1, and a charge generated by the photoelectric element PD_L1 may be transferred to the floating node FN1. An anode of the photoelectric element PD_L1 may be grounded. The second area SP1_2 may include a photoelectric element PD_R1 and a transmission transistor TX12. The transmission transistor TX12 is connected between the photoelectric element PD_R1 and the floating node FN1, and may be controlled by a transmission signal TG12. When the transmission transistor TX12 is turned on, a cathode of the photoelectric element PD_R1 is connected to the floating node FN1, and a charge generated by the photoelectric element PD_R1 may be transferred to the floating node FN1. An anode of the photoelectric element PD_R1 may be grounded.

The second sub-pixel SP2 may include a first area SP2_1 and a second area SP2_2. The first area SP2_1 may include a photoelectric element PD_L2 and a transmission transistor TX21. The transmission transistor TX21 is connected between the photoelectric element PD_L2 and the floating node FN1, and may be controlled by a transmission signal TG21. When the transmission transistor TX21 is turned on, a cathode of the photoelectric element PD_L2 is connected to the floating node FN1, and a charge generated by the photoelectric element PD_L2 may be transferred to the floating node FN1. An anode of the photoelectric element PD_L2 may be grounded. The second area SP2_2 may include a photoelectric element PD_R2 and a transmission transistor TX22. The transmission transistor TX22 is connected between the photoelectric element PD_R2 and the floating node FN1, and may be controlled by a transmission signal TG22. When the transmission transistor TX22 is turned on, a cathode of the photoelectric element PD_R2 is connected to the floating node FN1, and a charge generated by the photoelectric element PD_R2 may be transferred to the floating node FN1. An anode of the photoelectric element PD_R2 may be grounded.

The third sub-pixel SP3 may include a first area SP3_1 and a second area SP3_2. The first area SP3_1 may include a photoelectric element PD_L3 and a transmission transistor TX31. The transmission transistor TX31 is connected between the photoelectric element PD_L3 and the floating node FN1, and may be controlled by a transmission signal TG31. When the transmission transistor TX31 is turned on, a cathode of the photoelectric element PD_L3 is connected to the floating node FN1, and a charge generated by the photoelectric element PD_L3 may be transferred to the floating node FN1. An anode of the photoelectric element PD_L3 may be grounded. The second area SP3_2 may include a photoelectric element PD_R3 and a transmission transistor TX32. The transmission transistor TX32 is connected between the photoelectric element PD_R3 and the floating node FN1, and may be controlled by a transmission signal TG32. When the transmission transistor TX32 is turned on, a cathode of the photoelectric element PD_R3 is connected to the floating node FN1, and a charge generated by the photoelectric element PD_R3 may be transferred to the floating node FN1. An anode of the photoelectric element PD_R3 may be grounded.

The fourth sub-pixel SP4 may include a first area SP4_1 and a second area SP4_2. The first area SP4_1 may include a photoelectric element PD_L4 and a transmission transistor TX41. The transmission transistor TX41 is connected between the photoelectric element PD_L4 and the floating node FN1, and may be controlled by a transmission signal TG41. When the transmission transistor TX41 is turned on, a cathode of the photoelectric element PD_L4 is connected to the floating node FN1, and a charge generated by the photoelectric element PD_L4 may be transferred to the floating node FN1. An anode of the photoelectric element PD_L4 may be grounded. The second area SP4_2 may include a photoelectric element PD_R4 and a transmission transistor TX42. The transmission transistor TX42 is connected between the photoelectric element PD_R4 and the floating node FN1, and may be controlled by a transmission signal TG42. When the transmission transistor TX42 is turned on, a cathode of the photoelectric element PD_R4 is connected to the floating node FN1, and a charge generated by the photoelectric element PD_R4 may be transferred to the floating node FN1. An anode of the photoelectric element PD_R4 may be grounded.

In FIG. 2, one pixel PX1 is illustrated as including eight photoelectric elements PD_L1, PD_R1, PD_L2, PD_R2, PD_L3, PD_R3, PD_L4, and PD_R4, but the present invention is not limited thereto, and one pixel PX1 may include more or fewer photoelectric elements. Each of the photoelectric elements PD_L1, PD_R1, PD_L2, PD_R2, PD_L3, PD_R3, PD_L4, and PD_R4 may sense external light to generate a charge.

In some example embodiments, the photoelectric elements PD_L1 and PD_R1 of the first sub-pixel SP1, the photoelectric elements PD_L2 and PD_R2 of the second sub-pixel SP2, the photoelectric elements PD_L3 and PD_R4 of the third sub-pixel SP3, and the photoelectric elements PD_L4 and PD_R4 of the fourth sub-pixel SP4 may correspond to a color filter of the same color. For example, one of the first to fourth sub-pixels SP1 to SP4 may correspond to a blue color filter, another thereof may correspond to a red color filter, and the other two thereof may correspond to a green color filter. The structure in which one pixel PX1 of FIG. 2 includes four sub-pixels, two sub-pixels of the four sub-pixels have a green color filter, and the remaining two sub-pixels have a red color filter and a blue color filter, respectively may be referred to as a tetra cell structure.

The pixel PX1 according to some example embodiments may include a pixel circuit PC1 that outputs an electrical signal by processing a charge generated by the photoelectric element (PD_L1, PD_R1, PD_L2, PD_R2, PD_L3, PD_R3, PD_L4, or PD_R4) that generates the charge in response to light.

Specifically, the pixel circuit PC1 may include driving transistors DX11 and DX12, a selection transistor SX1, a reset transistor RX1, and a switch transistor SW1. The transistors DX11, DX12, SX1, RX1, and SW1 in the pixel circuit PC1 may respond to control signals provided from the row driver 130, for example a selection signal SEL, a reset control signal RG, and a gain control signal DCG to operate. In some example embodiments, the selection signal SEL, the reset control signal RG, and the gain control signal DCG may be transmitted through different lines among corresponding row lines.

In some example embodiments, the pixel circuit PC1 may include a plurality of floating diffusions FD1 and FD2. Each of the plurality of floating diffusions FD1 and FD2 may have a predetermined (or alternatively, desired) capacitance, and may store charges generated by the photoelectric elements in the plurality of sub-pixels SP1, SP2, SP3, and SP4. For example, the plurality of floating diffusions FD1 and FD2 may be configured as capacitors. Although two floating diffusions FD1 and FD2 are illustrated in FIG. 2, the pixel circuit PC1 may have three or more floating diffusions.

Gates of the driving transistors DX11 and DX12 may be connected to the floating node FN1. The driving transistors DX11 and DX12 may operate as a source-follower amplifier that transmits a voltage of the floating node FN1 to the selection transistor SX1. The driving transistors DX11 and DX12 may output a pixel signal to the column line CL through the selection transistor SX1 in response to the voltage of the floating node FN1.

The selection transistor SX1 may be connected between the driving transistors DX11 and DX12 and the column line CL to be controlled by the selection signal SEL. When the selection transistor SX1 is turned on, a pixel voltage VS outputted from the driving transistors DX11 and DX12 may be outputted to the readout circuit (150 in FIG. 1) through the column line CL connected to the selection transistor SX1.

The reset transistor RX1 is connected between a power voltage line supplying a power voltage VDD and the floating node FN1, and may be controlled by the reset control signal RG. The reset transistor RX1 may be used to reset (or initialize) an internal voltage (or current) of the pixel PX1.

When the reset transistor RX1 is turned on by the reset signal RG, and when the switch transistor SW1 and each of the transmission transistors TX11, TX12, TX21, TX22, TX31, TX32, TX41, and TX42 are turned on, all voltages of the floating node FN1 and the photoelectric elements may be reset by the power voltage VDD.

The switch transistor SW1 is connected between the floating node FN1 and the reset transistor RX1, and may be controlled by the gain control signal DCG. The switch transistor SW1 may adjust a conversion gain when voltages (or currents) generated by the photoelectric elements are transmitted to the floating node FN1. The conversion gain, which is a ratio at which a charge is converted into a voltage, may be proportional to the capacitance of the floating node FN1. When the capacitance of the floating node FN1 is increased, the conversion gain when the voltages (or currents) generated by the photoelectric elements are transmitted to the floating node FN1 may be decreased. When the capacitance of the floating node FN1 is decreased, the conversion gain when the voltages (or currents) generated by the photoelectric elements are transmitted to the floating node FN1 may be increased.

In some example embodiments, the switch transistor SW1 may dynamically adjust a range of intensity of light sensed by the photoelectric elements by adjusting the capacitance of the floating node FN1. That is, the image sensor 100 may achieve a high dynamic range (HDR). For example, when the switch transistor SW1 is turned on, the first floating diffusion FD1 and the second floating diffusion FD2 may be connected to the floating node FN1 so that the capacitance of the floating node FN1 may increase, and when the switch transistor SW1 is turned off, the first floating diffusion FD1 may be connected to the floating node FN1 so that the capacitance of the floating node FN1 may decrease.

For example, when the switch transistor SW1 is turned off, the floating node FN1 has the capacitance of the first floating diffusion FD1. In this case, since the capacitance connected to the floating node FN1 is small, the image sensor 100 may generate an image signal in a high conversion gain (HCG) mode. A gain of circuits (for example, the readout circuit 150) for processing the pixel signal VS when operating in the HCG mode may be relatively smaller than a gain of the readout circuit 150 when operating in the low conversion gain (LCG) mode. Accordingly, an SNR of the image sensor 100 may be increased to lower a minimum detectable light amount, and low light amount detecting performance of the image sensor 100 may be improved. When the switch transistor SW1 is turned on, the second floating diffusion FD2 may be connected to the floating node FN1. Since the first floating diffusion FD1 and the second floating diffusion FD2 are coupled in parallel to the floating node FN1, the capacitance of the floating node FN1 increases by the capacitance of the second floating diffusion FD2 compared to that before the switch transistor SW1 is turned on. In this case, since the capacitance connected to the floating node FN1 is larger than that before the switch transistor SW1 is turned on, the image sensor 100 may generate an image signal by operating in the LCG mode in which the amount of charge that may be processed within the pixel is greater than in the HCG mode. Accordingly, the high light amount detecting performance of the image sensor 100 may be improved.

In summary, the pixel PX1 may operate in the LCG mode when the switch transistor SW1 is turned on, and in HCG mode when the switch transistor SW11 is turned off.

Figure 3:
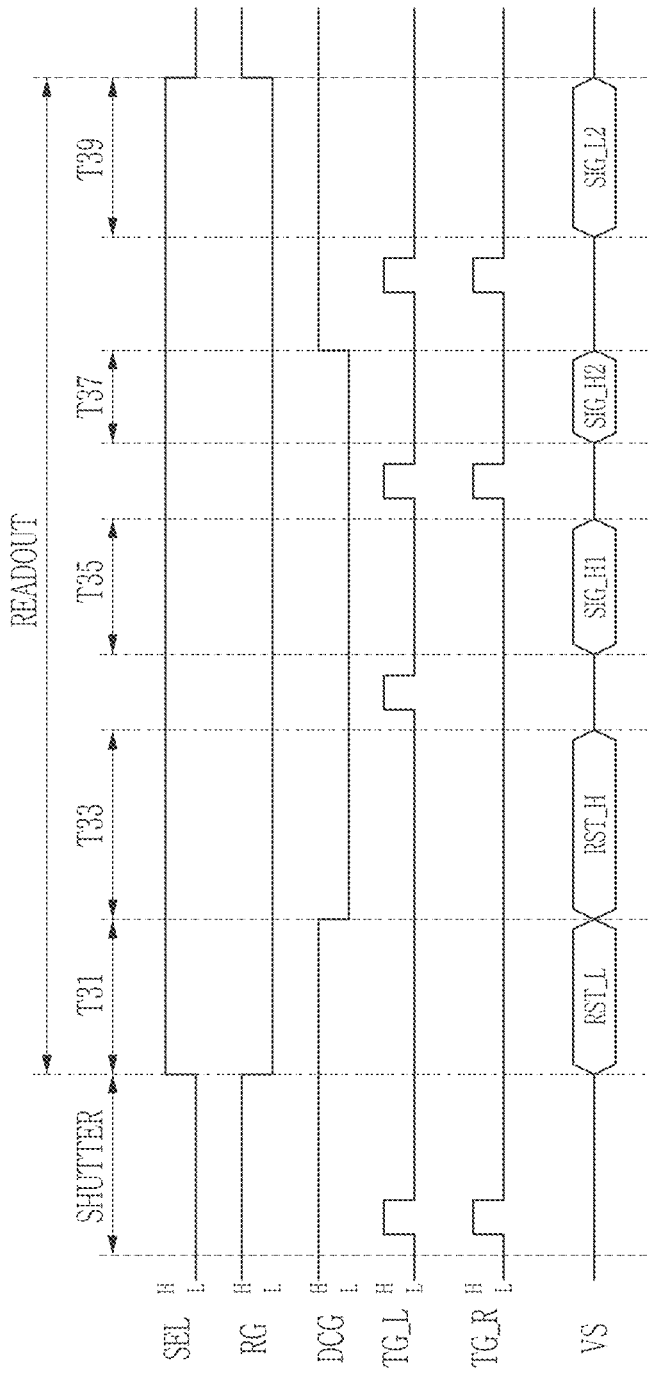
FIG. 3 illustrates an operation timing of a pixel according to an example embodiment.

FIG. 3 illustrates an operation timing of a pixel according to an example embodiment.

In FIG. 3, a scan period for driving a plurality of pixels in a row line unit may be illustrated. One scan period may sequentially include a shutter period (SHUTTER) and a read period (READOUT).

An operation of a pixel will be described with reference to FIG. 2 and FIG. 3.

The transmission signal TG11 applied to the transmission transistor TX11, the transmission signal TG21 applied to the transmission transistor TX21, the transmission signal TG31 applied to the transmission transistor TX31, and the transmission signal TG41 applied to the transmission transistor TX41 may all have the same waveform, wherein the transmission transistors TX11, TX21, TX31, and TX41 are positioned in the first areas SP1_1, SP2_1, SP3_1, and SP4_1 of respective sub-pixels SP1, SP2, SP3, and SP4, and these may be shown as a first transmission signal TG_L in FIG. 3.

In addition, the transmission signal TG12 applied to the transmission transistor TX12, the transmission signal TG22 applied to the transmission transistor TX22, the transmission signal TG32 applied to the transmission transistor TX32, and the transmission signal TG42 applied to the transmission transistor TX42 may all have the same waveform, wherein the transmission transistors TX12, TX22, TX32, and TX42 are positioned in the second areas SP1_2, SP2_2, SP3_2, and SP4_2 of respective sub-pixels SP1, SP2, SP3, and SP4, and these may be shown as a first transmission signal TG_R in FIG. 3.

In the shutter period (SHUTTER), the charges stored in the first floating diffusion FD1 and the second floating diffusion FD2 may be reset.

Specifically, the gain control signal DCG of a high level may be applied to the gate of the switch transistor SW1 so that the switch transistor SW1 may be turned on. The first floating diffusion FD1 and the second floating diffusion FD2 may be connected to the floating node FN1.

The first and second transmission signals TG_L and TG_R of a high level are applied to the gates of the transmission transistors TX11, TX12, TX21, TX22, TX31, TX32, TX41, and TX42, respectively, so that the transmission transistors TX11, TX12, TX21, TX22, TX31, TX32, TX41, and TX42 may be turned on. In this case, the charge remaining in the photoelectric elements PD_L1, PD_R1, PD_L2, PD_R2, PD_L3, PD_R3, PD_L4, and PD_R4 may be provided to the first floating diffusion FD1 and the second floating diffusion FD2. The reset signal RG of a high level is applied to the gate of the reset transistor RX1 within the shutter period (SHUTTER), so that the reset transistor RX1 may be turned on. Then, the power voltage VDD is supplied to the floating node FN1, so that the first floating diffusion FD1 and the second floating diffusion FD2 may be reset. In some example embodiments, the reset voltage may be, for example, the power voltage VDD. In this case, the selection signal SEL of a low level may be applied to the selection transistor SX1, so that the selection transistor SX1 may be turned off.

Thereafter, the first transmission signal TG_L and the second transmission signal TG_R are transitioned from the high level to the low level, so that the transmission transistors TX11, TX12, TX21, TX22, TX31, TX32, TX41, and TX42 may be turned off. During that, the photoelectric elements PD_L1, PD_R1, PD_L2, PD_R2, PD_L3, PD_R3, PD_L4, and PD_R4 may be exposed to light, so that a charge may be generated.

The read period (READOUT) is a period in which the pixel signal VS generated by the pixel PX1 is transmitted to the readout circuit 150. The pixel PX1 may output an LCG reset signal RST_L during a period T31, an HCG reset signal RST_H during a period T33, a first HCG signal SIG_H1 during a period T35, a second HCG signal SIG_H2 during a period T37, and a second LCG signal SIG_L2 during the period T39, as the pixel signal VS.

The conversion gain may be adjusted according to whether the switch transistor SW1 is driven according to the gain control signal DCG. For example, as described above, when the switch transistor SW1 is turned off, the pixel PX1 may operate in the HCG mode in which the pixel signal VS is generated based on the charge stored in the first floating diffusion FD1, and when the switch transistor SW1 is turned on, it may operate in the LCG mode in which the pixel signal VS is generated based on the charges stored in the first floating diffusion FD1 and the second floating diffusion FD2. An operation of the image sensor 100 in the read period (READOUT) will be described with reference to FIG. 4.

Figure 4:
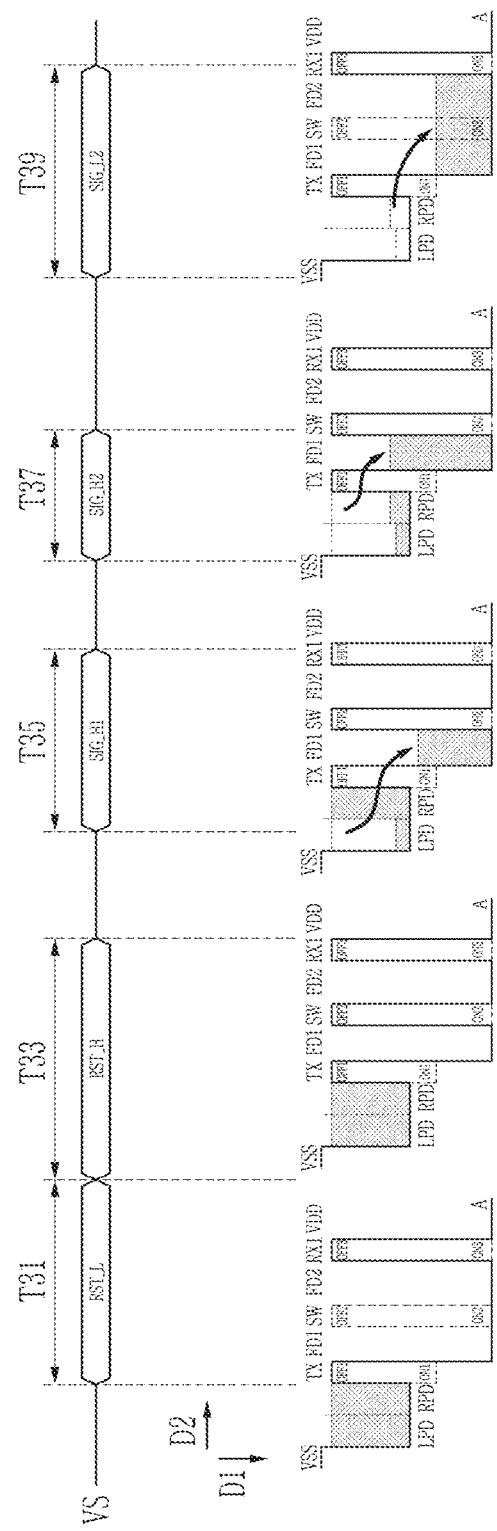
FIG. 4 illustrates a change in a potential level of each channel area within one pixel according to an operation of an image sensor according to FIG. 3.

FIG. 4 illustrates a change in a potential level of each channel area within one pixel according to an operation of an image sensor according to FIG. 3.

The photoelectric elements PD_L1, PD_L2, PD_L3, and PD_L4 positioned in the first areas SP1_1, SP2_1, SP3_1, and SP4_1 of each of the sub-pixels SP1, SP2, SP3, and SP4 in the pixel PX1 are shown as a first photoelectric element LPD. In addition, the photoelectric elements PD_R1, PD_R2, PD_R3, and PD_R4 positioned in the second areas SP1_2, SP2_2, SP3_2, and SP4_2 of each of the sub-pixels SP1, SP2, SP3, and SP4 in the pixel PX1 are shown as a second photoelectric element RPD. Amounts of charges generated by the photoelectric elements LPD and RPD may correspond to areas of hatched portions in areas of the photoelectric elements LPD and RPD of FIG. 4.

For better understanding and ease of description, in FIG. 4, the transmission transistors TX11, TX12, TX21, TX22, TX31, TX32, TX41, and TX42 of each of the sub-pixels SP1, SP2, SP3, and SP4 in the pixel PX1 are shown as one transmission transistor TX area.

FIG. 4 illustrates a potential level of each of the reference voltage VSS, the first photoelectric element LPD area, the second photoelectric element RPD area, the channel area of the transmission transistor TX, the first floating diffusion FD1 area, the switch transistor SW1 area, the second floating diffusion FD2 area, the channel area of the reset transistor RX1, and the power voltage VDD.

In FIG. 4, the potential of each channel is indicated by a height in a D1 direction. In addition, the capacitance of each channel is indicated by a width along a D2 direction.

The potential level of the channel area of the transmission transistor TX may vary between a first potential ON1 and a second potential OFF1 in response to a logic level of the transmission signal TG. The potential level of the channel area of the switch transistor SW1 may vary between a third potential ON2 and a fourth potential OFF2 in response to a logic level of the gain control signal DCG. In addition, the potential level of the channel area of the reset transistor RX1 may vary between a fifth potential ON3 and a sixth potential OFF3 in response to a logic level of the reset signal RG. In addition, the power voltage VDD may have an 'A' potential. In FIG. 4, the second potential OFF1, the fourth potential OFF2, and the sixth potential OFF3 are illustrated as the same potential, but the present invention is not limited thereto, and the second potential OFF1, the fourth potential OFF2, and the sixth potential OFF3 may be different from each other.

The selection signal SEL of a high level may be applied to the gate of the selection transistor SX1, so that the selection transistor SX1 may be turned on. In addition, since the gain control signal DCG is maintained at a high level, the first floating diffusion FD1 and the second floating diffusion FD2 may be connected at the floating node FN1.

During the period T31, the voltage of the floating node FN1 according to the charge stored in the first floating diffusion FD1 and the second floating diffusion FD2 may be outputted to the column line CL as the pixel signal VS, that is, the LCG reset signal RST_L, through the driving transistors DX11 and DX12. Since the transmission transistor TX is turned off, the transmission transistor TX may have the second potential OFF1. Accordingly, the charge accumulated in the first photoelectric element LPD and the second photoelectric element RPD cannot be transmitted to the first floating diffusion FD1. Meanwhile, since the switch transistor SW1 is turned on, it may have the third potential ON2. Since the reset transistor RX1 is turned off, the reset transistor RX1 may have the sixth potential OFF3.

Next, when the gain control signal DCG transitions to a low level, the switch transistor SW1 may be turned off.

During the period T33, the voltage of the floating node FN1 according to the charge stored in the first floating diffusion FD1 may be outputted to the column line CL as the pixel signal VS, that is, the HCG reset signal RST_H, through the driving transistors DX11 and DX12. Since the transmission transistor TX is turned off, the transmission transistor TX may have the second potential OFF1. Accordingly, the charge accumulated in the first photoelectric element LPD and the second photoelectric element RPD cannot be transmitted to the first floating diffusion FD1. Since the switch transistor SW1 is turned off, it may have the fourth potential OFF2. Since the reset transistor RX1 is turned off, the reset transistor RX1 may have the sixth potential OFF3.

Thereafter, the first transmission signal TG_L of a high level is applied to the gates of the transmission transistors TX11, TX21, TX31, and TX41, so that the charges generated by the photoelectric elements PD_L1, PD_L2, PD_L3, and PD_L4, that is, the first photoelectric element LPD may be provided to the first floating diffusion FD1. Specifically, the charge generated by the first photoelectric element LPD may be transferred to the first floating diffusion FD1 through the channel area of the transmission transistors TX11, TX21, TX31, and TX41. Accordingly, the amount of the charge stored in the first floating diffusion FD1 may be changed.

During the period T35, the voltage of the floating node FN1 according to the charge stored in the changed first floating diffusion FD1 may be outputted to the column line CL as the pixel signal VS, that is, the first HCG signal SIG_H1 through the driving transistors DX11 and DX12. The first HCG signal SIG_H1 may be a pixel signal according to the charge accumulated in the first floating diffusion FD1 of the charges generated by the photoelectric elements PD_L1, PD_L2, PD_L3, and PD_L4 positioned at the left sides of respective sub-pixels SP1, SP2, SP3, and SP4 in the pixel PX1. That is, the first HCG signal SIG_H1 may be a left phase signal obtained by sensing a left side image of the object (OBJECT) when the image sensor 100 operates in the HCG mode. Since the transmission transistor TX is turned off, the transmission transistor TX may have the second potential OFF1. In addition, the charge generated by the first photoelectric element LPD may be stored in the first floating diffusion FD1. In this case, since the switch transistor SW1 is turned off, it may have the fourth potential OFF2. Since the reset transistor RX1 is turned off, the reset transistor RX1 may have the sixth potential OFF3.

Then, the first transmission signal TG_L of the high level and the second transmission signal TG_R of the high level are applied to the gates of the transmission transistors TX11, TX12, TX21, TX22, TX31, TX32, TX41, and TX42, so that the charges generated by the photoelectric elements PD_L1, PD_R1, PD_L2, PD_R2, PD_L3, PD_R3, PD_L4, and PD_R4, that is, the first photoelectric element LPD and the second photoelectric element RPD, may be provided to the first floating diffusion FD1. Specifically, the charge generated by the first photoelectric element LPD may be transferred to the first floating diffusion FD1 through the channel areas of the transmission transistors TX11, TX21, TX31, and TX41, and the charge generated by the second photoelectric element RPD may be transferred to the first floating diffusion FD1 through the channel areas of the transmission transistors TX12, TX22, TX32, and TX42. Accordingly, the charge stored in the first floating diffusion FD1 may be changed.

During the period T37, the voltage of the floating node FN1 according to the charge stored in the first floating diffusion FD1 may be outputted to the column line CL as the pixel signal VS, that is, the second HCG signal SIG_H2 through the driving transistor DX. The second HCG signal SIG_H2 be a pixel signal according to the charge accumulated in the first floating diffusion FD1, among the charges generated by the photoelectric elements PD_L1, PD_L2, PD_L3, and PD_L4 positioned at the left sides of respective sub-pixels SP1, SP2, SP3, and SP4 in the pixel PX1 and the charges generated by the photoelectric elements PD_R1, PD_R2, PD_R3, and PD_R4 positioned at the right sides of respective sub-pixels SP1, SP2, SP3, and SP4 in the pixel PX1. That is, the second HCG signal SIG_H2 may be a signal obtained by adding the right phase signal to the left phase signal when the image sensor 100 operates in the HCG mode.

Since the transmission transistor TX is turned off, the transmission transistor TX may have the second potential OFF1. In addition, the charges generated by the first photoelectric element LPD and the second photoelectric element RPD may be stored in the first floating diffusion FD1. In this case, since the switch transistor SW1 is turned off, it may have the fourth potential OFF2. Since the reset transistor RX1 is turned off, the reset transistor RX1 may have the sixth potential OFF3.

Thereafter, the gain control signal DCG of a high level is applied to the switch transistor SW1, so that the first floating diffusion FD1 and the second floating diffusion FD2 may be connected to the floating node FN1. In addition, the first transmission signal TG_L of the high level and the second transmission signal TG_R of the high level are applied to the gates of the transmission transistors TX11, TX12, TX21, TX22, TX31, TX32, TX41, and TX42, so that the charges generated by the photoelectric elements PD_L1, PD_R1, PD_L2, PD_R2, PD_L3, PD_R3, PD_L4, and PD_R4, that is, the first photoelectric element LPD and the second photoelectric element RPD, may be provided to the first floating diffusion FD1 and the second floating diffusion FD2. Specifically, the charge generated by the first photoelectric element LPD may be transferred to the first floating diffusion FD1 and the second floating diffusion FD2 through the channel areas of the transmission transistors TX11, TX21, TX31, and TX41, and the charge generated by the second photoelectric element RPD may be transferred to the first floating diffusion FD1 and the second floating diffusion FD2 through the channel areas of the transmission transistors TX12, TX22, TX32, and TX42. Accordingly, the charges stored in the first floating diffusion FD1 and the second floating diffusion FD2 may be changed.

During the period T39, the voltage of the floating node FN1 according to the charge stored in the first floating diffusion FD1 and the second floating diffusion FD2 may be outputted to the column line CL as the pixel signal VS, that is, the second LCG signal SIG_L2 through the driving transistor DX. The second LCG signal SIG_L2 be a pixel signal according to the charge accumulated in the first floating diffusion FD1 and the second floating diffusion FD2, among the charges generated by the photoelectric elements PD_L1, PD_L2, PD_L3, and PD_L4 positioned at the left sides of respective sub-pixels SP1, SP2, SP3, and SP4 in the pixel PX1 and the charges generated by the photoelectric elements PD_R1, PD_R2, PD_R3, and PD_R4 positioned at the right sides of respective sub-pixels SP1, SP2, SP3, and SP4 in the pixel PX1. That is, the second LCG signal SIG_L2 may be a signal obtained by adding the left phase signal and the right phase signal when the image sensor 100 operates in the LCG mode.

Since the transmission transistor TX is turned off, the transmission transistor TX may have the second potential OFF1. In this case, since the switch transistor SW1 is turned on, it may have the third potential ON2. Accordingly, the first floating diffusion FD1 and the second floating diffusion FD2 are connected, so that the charges generated by the first photoelectric element LPD and the second photoelectric element RPD may be stored in the first floating diffusion FD1 and the second floating diffusion FD2. Since the reset transistor RX1 is turned off, the reset transistor RX1 may have the sixth potential OFF3.

The readout circuit 150 may perform auto-focusing by using the first HCG signal SIG_H1, the second HCG signal SIG_H2, and the second LCG signal SIG_L2 that are read during the read period (READOUT). For example, the readout circuit 150 may obtain a right phase signal when the image sensor 100 operates in the HCG mode by subtracting the first HCG signal SIG_H1 from the second HCG signal SIG_H2. In addition, the readout circuit 150 may obtain a left phase signal when the image sensor 100 operates in the LCG mode by using the first HCG signal SIG_H1. It is assumed that capacity (that is, the first floating diffusion FD1) of the floating diffusion when the image sensor 100 operates in the HCG mode and capacity (that is, a sum of the first floating diffusion FD1 and the second floating diffusion FD2) of the floating diffusion when the image sensor 100 operates in the LCG mode are 1:4. In this case, the readout circuit 150 may divide the first HCG signal SIG_H1 by 4 to obtain the left phase signal when the image sensor 100 operates in the LCG mode. Finally, the readout circuit 150 may obtain the right phase signal when the image sensor 100 operates in the LCG mode by subtracting the left phase signal when the image sensor 100 operates in the LCG mode from the second LCG signal SIG_L2.

When the signal of the pixel PX1 is read by the operation method according to FIG. 3, there may be a problem or challenge in that data for the left phase signal and the right phase signal for the image sensor 100 cannot be accurately obtained. For example, when the charge generated by the first photoelectric element LPD is larger than the capacity of the first floating diffusion FD1, the readout circuit 150 cannot obtain an accurate left phase signal by using only the first floating diffusion FD1. That is, the readout circuit 150 cannot acquire the accurate left phase signal only by obtaining the left phase signal in the HCG mode. Therefore, it is necessary to obtain the left phase signal by using a floating diffusion having more capacity. Therefore, after reading the first HCG signal SIG_H1, a method of obtaining the left phase signal when operating in the LCG mode by transmitting the charge of the first floating diffusion FD1 also to the second floating diffusion FD2 may be considered. However, in this case, in order to obtain the second HCG signal SIG_H2, the charge transmitted from the first floating diffusion FD1 to the second floating diffusion FD2 needs to be again transmitted to the first floating diffusion FD1, and the charge generated by the second photoelectric element RPD needs to be transmitted to the first floating diffusion FD1. However, since the second floating diffusion FD2 is configured of a typical capacitor having two electrodes, it is difficult to transmit only the charge transmitted from the first floating diffusion FD1 to the second floating diffusion FD2 among the charges accumulated in the second floating diffusion FD2 to the first floating diffusion FD1 again. Therefore, according to the pixel operation method according to FIG. 3, it is difficult to obtain an actual left phase signal when operating in the LCG mode by using both the first floating diffusion FD1 and the second floating diffusion FD2.

Furthermore, since the auto-focusing using the pixel signal VS read by the method according to FIG. 3 does not actually use the left phase signal when driving in the LCG mode but it processes and uses the first HCG signal SIG_H1 read in the HCG mode, there may be many errors.

Figure 5:
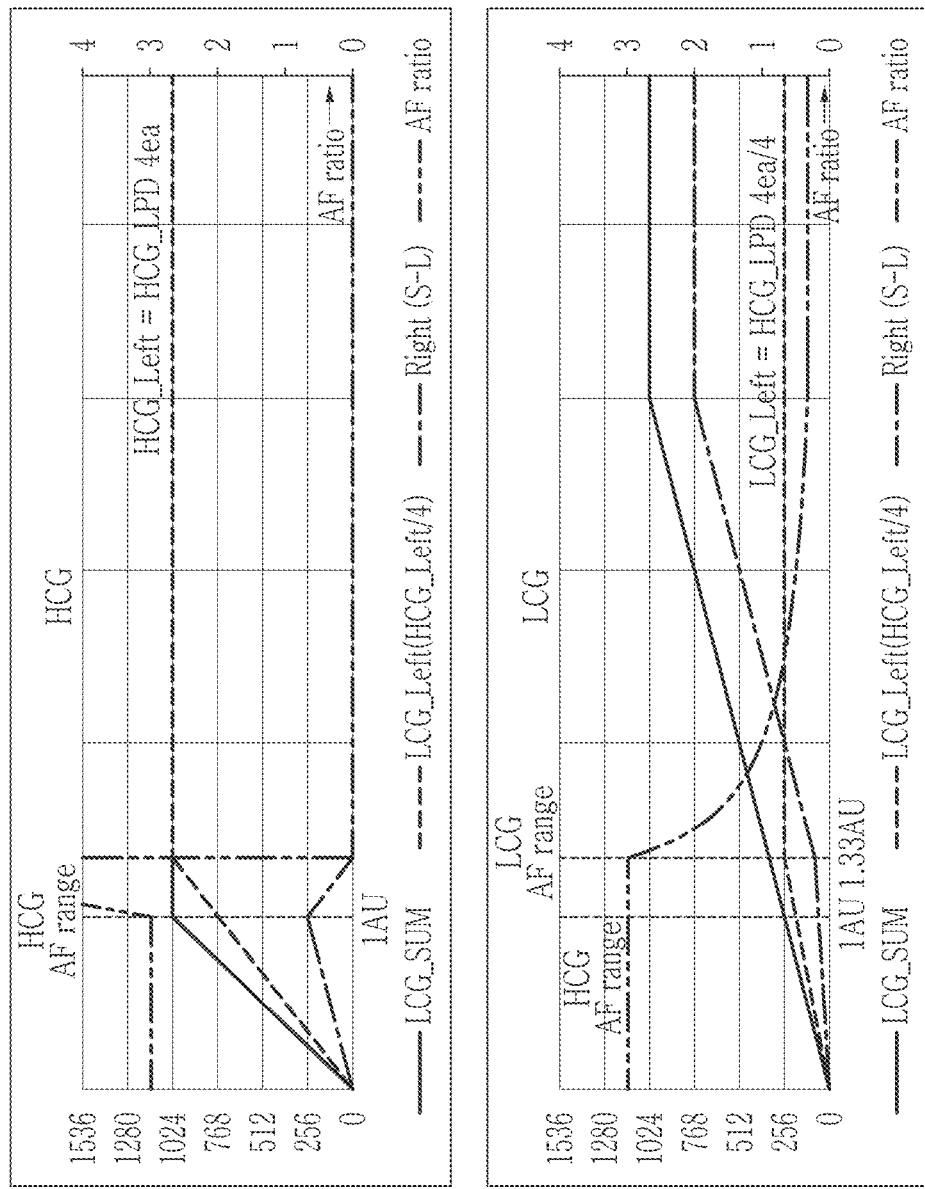
FIG. 5 illustrates an AF graph of the pixel when the pixel according to FIG. 2 is driven according to FIG. 3.

FIG. 5 illustrates an AF graph of the pixel when the pixel according to FIG. 2 is driven according to FIG. 3.

In FIG. 5, a vertical axis means a code value (for example, 10 bits) corresponding to the charge accumulated in the first floating diffusion FD1, and a horizontal axis may mean illuminance.

In the HCG mode, the first floating diffusion FD1 may be saturated by an illuminance of 1 AU. When the first floating diffusion FD1 is saturated, a charge corresponding to a code value of 1024 may be stored in the first floating diffusion FD1. An auto-focus (AF) range may be expressed as an illuminance range in which the magnitude of the left phase signal and the magnitude of the right phase signal satisfy a predetermined (or alternatively, desired) ratio (for example, 3:1). Accordingly, 1 AU in which the code value of the left phase signal by the first photoelectric element LPD is 768 and the code value of the right phase signal is 256 may be the AF range in the HCG mode.

In the LCG mode, the first floating diffusion FD1 and the second floating diffusion FD2 may be saturated by the illuminance of 4 AU. As described above, the left phase signal in the LCG mode may be calculated by dividing the left phase signal SIG_H1 in the HCG mode by 4. Then, the code value 256 calculated by dividing the code value 1024 when the first floating diffusion FD1 is saturated in the HCG mode by 4 may be the magnitude of the left phase signal in the LCG mode. Then, in the AF range, the magnitude of the left phase signal and the magnitude of the right phase signal in the LCG mode satisfying 3:1 may be calculated as 85.3. Since the code value 1024 is outputted by the illuminance of 4 AU, the illuminance for outputting the code value of 341.3, which is a sum of 256 and 85.3, may be calculated as 1.33 AU. Then, the illuminance of 1.33 AU may be calculated as the AF range in the LCG mode.

Figure 6:
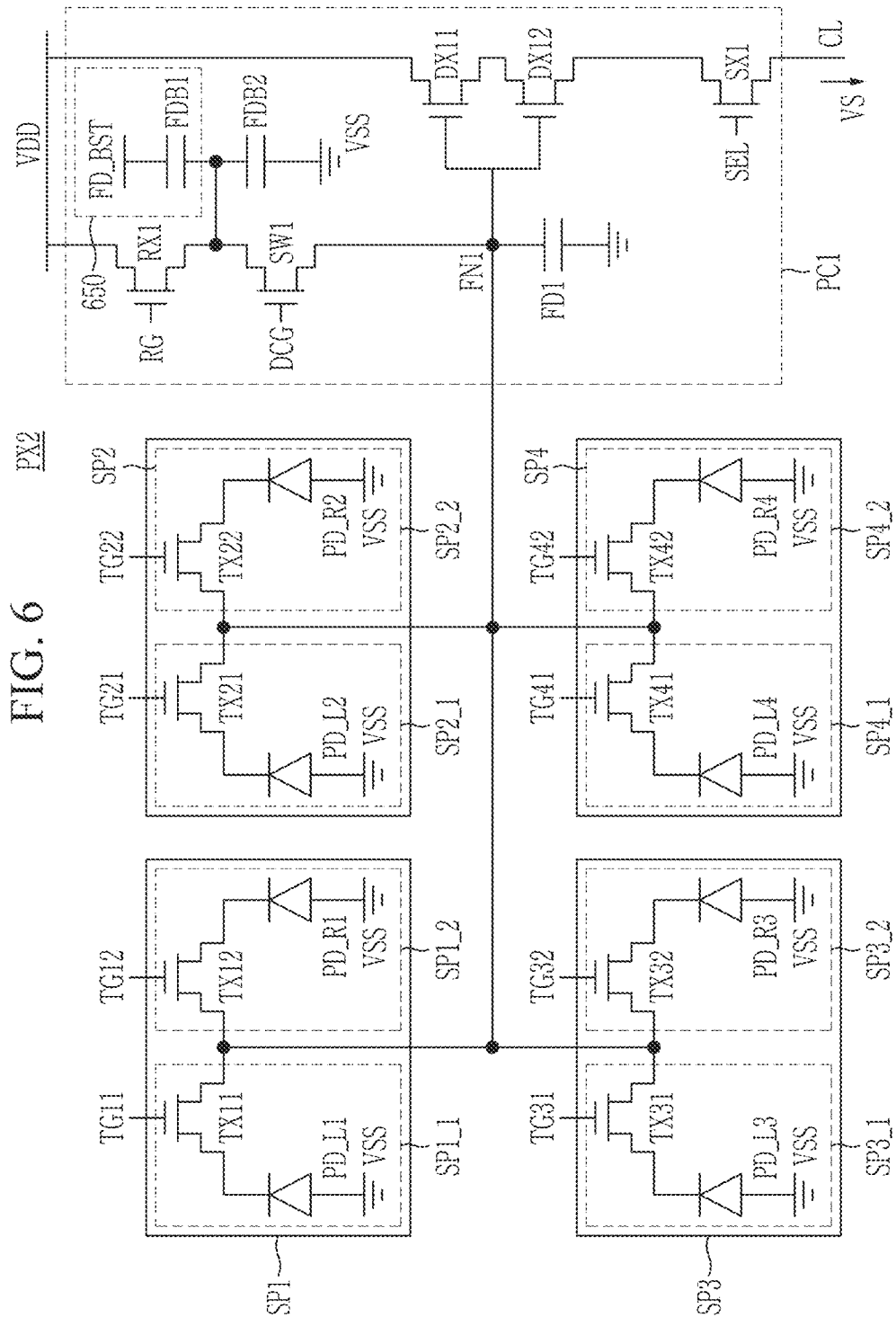
FIG. 6 illustrates a circuit diagram of a pixel according to an example embodiment.

FIG. 6 illustrates a circuit diagram of a pixel according to an example embodiment.

Referring to FIG. 6, a pixel PX2 may include a first sub-pixel SP1, a second sub-pixel SP2, a third sub-pixel SP3, and a fourth sub-pixel SP4. In descriptions of the pixel PX2 of FIG. 6, descriptions of the same and similar components as those of the pixel PX1 of FIG. 2 will be omitted.

In some example embodiments, where a boosting control signal FD_BST is applied to a silicon layer of the floating diffusion FD2, the pixel PX2 may further include a boosting area 650. However, where the boosting control signal FD_BST is not applied to the floating diffusion FD2, the pixel PX2 may not include the boosting area 650. The boosting area 650 may include a parasitic electrode FDB1 generated when the boosting control signal FD_BST is applied. That is, in the floating diffusion FD2 of FIG. 6, the silicon layer itself may operate as a capacitor having capacitance, and the boosting control signal FD_BST may be applied to the silicon layer of the floating diffusion FD2 including the parasitic electrode FDB1, so that the potential of the floating diffusion FD2 may be changed by the boosting control signal FD_BST.

Figure 7:
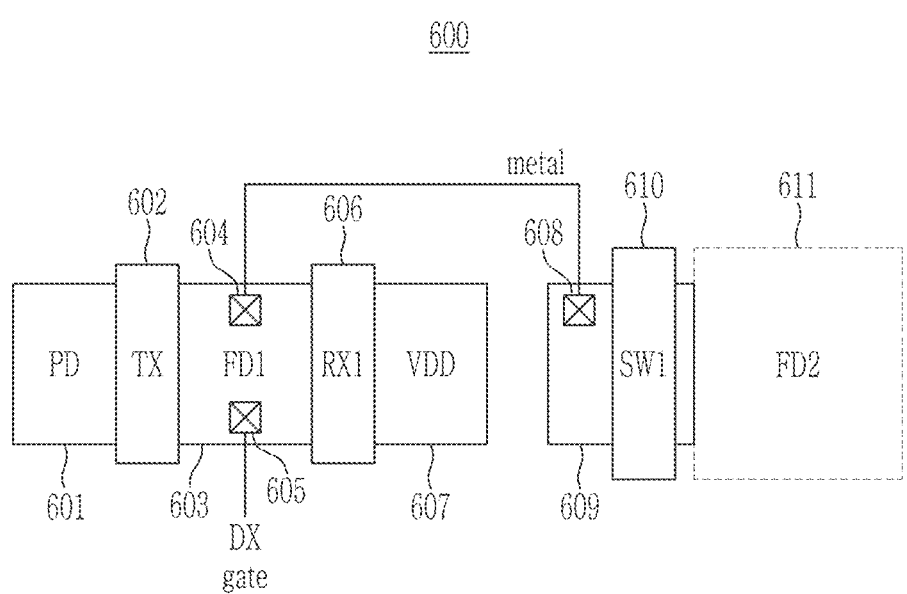
FIG. 7 illustrates a schematic top view of a pixel according to an example embodiment.

FIG. 7 illustrates a schematic top view of a pixel according to an example embodiment.

Specifically, FIG. 7 illustrates a pixel 600 according to an example of the pixel PX1 of FIG. 2. Referring to FIG. 7, one pixel 600 may include a photoelectric element area (PD) 601, a transmission transistor area (TX) 602, a first floating diffusion area (FD1) 603, a plurality of contact areas 604, 605, and 608, a reset transistor area (RX1) 606, a power voltage area (VDD) 607, an separation area 609, a switch transistor area (SW1) 610, and a second floating diffusion area (FD2) 611.

In some example embodiments, the pixel 600 may be formed by deep trench isolation (DTI) process to prevent or hinder electrical and optical crosstalk between adjacent pixels. For example, the pixel 600 may be formed on a substrate including an oxide and the like, and the substrate may include a material with high reflectivity, for example, polysilicon containing boron. When the substrate includes polysilicon containing boron, the substrate may be provided as a p-well area for a plurality of transistors TX, DX, RX1, and SW1. An n-type impurity may be implanted into a portion of the p-well area to be provided as drain and source areas of each of the transistors TX, DX, RX1, and SW1. The portion of the p-well area provided as the drain and source areas may be doped with n+.

The photoelectric element area 601 may include a plurality of photoelectric elements.

The transmission transistor area 602 may have a vertical gate structure extending in a depth direction from a first surface defined as an upper surface of the pixel 600. That is, the transmission transistor area 602 may extend in a depth direction perpendicular to the upper surface of the pixel 600, and may be adjacent to a photoelectric element disposed under the transmission transistor area 602.

The first floating diffusion area 603 may be formed at an opposite side of the photoelectric element area 601 with respect to the transmission transistor area 602. As described above, the charge generated by receiving light from the photoelectric element area 601 may be transferred to the first floating diffusion area 603 through the transmission transistor area 602. Specifically, when a transmission signal is applied to the transmission gate electrode positioned at an upper portion of the transmission transistor area 602 (and partially buried in the semiconductor substrate) so that a charge transmitting path is formed at a lower portion of the transmission gate electrode, the charge generated by receiving light from the photoelectric element area 601 may be transferred to the floating diffusion area 603 to be accumulated in the first floating diffusion area 603.

The first floating diffusion area 603 may be formed adjacent to the transmission transistor area 602. The first floating diffusion area 603 may include a plurality of contact areas 604 and 605. The first contact area 604 may be electrically connected to the third contact area 608 included in the separation area 609 through a metal wire (metal). Accordingly, the first floating diffusion area 603 and the separation area 609 are areas physically separated from each other, and in an equivalent circuit, as shown in FIG. 2, these may provide one node.

The second contact area 605 may be connected to the gate of the driving transistor. Specifically, a signal generated by the charge accumulated in the first floating diffusion area 603 may be outputted to the gate of the driving transistor through a wire (DX gate) connected to the second contact area 605.

The reset transistor area 606 may have a vertical gate structure extending in a depth direction from a first surface defined as an upper surface of the pixel 600. That is, the reset transistor area 606 may extend in a depth direction perpendicular to the upper surface of the pixel 600. As described above, when a reset control signal is applied to the reset gate electrode positioned at an upper portion of the reset transistor area 606 so that a charge transmitting path is formed at a lower portion of the reset gate electrode, the first floating diffusion area 603 and the power voltage area 607 are connected, so that the charge accumulated in the first floating diffusion area 603 may be transferred to the power voltage area 607.

The power voltage area 607 may be a conductive area to which a power voltage is supplied.

The switch transistor area 610 may have a vertical gate structure extending in a depth direction from a first surface defined as an upper surface of the pixel 600. That is, the switch transistor area 610 may extend in a depth direction perpendicular to the upper surface of the pixel 600.

The second floating diffusion area 611 may be formed in a silicon layer. The second floating diffusion area 611 may include a silicon layer, and an electrode on the silicon layer. The electrode may be formed of (or alternatively, include) polysilicon. In the second floating diffusion area 611, the electrode and the silicon layer may be insulated by an insulation layer. The boosting control signal FD_BST may be applied to the electrode.

As described above, when a gain control signal is applied to the switch gate electrode positioned at an upper portion of the switch transistor area 610 so that a charge transmitting path is formed at a lower portion of the switch gate electrode, the separation area 609 and the second floating diffusion 611 may be connected. In this case, the charge stored in the first floating diffusion area 603 may be transferred to the separation area 609 through the metal wire (metal) to be accumulated in the second floating diffusion area 611.

When a transmission signal is applied to the transmission gate electrode while a gain control signal is applied to the switch gate electrode, since the photoelectric element area 601 and the first floating diffusion area 603 are connected, and the first floating diffusion area 603 and the second floating diffusion area 611 are connected, the charge generated in the photoelectric element area 601 may be transferred to the second floating diffusion area 611 through the metal wire (metal).

Depending on the voltage applied to the electrode of the second floating diffusion area 611, the charge stored in the first floating diffusion area 603 may be transferred to the second floating diffusion area 611 through the switch transistor area 610 and the metal wire (metal), or the charge stored in the second floating diffusion area 611 may be transferred to the first floating diffusion area 603 through the switch transistor area 610 and the metal wire (metal).

Figure 8:
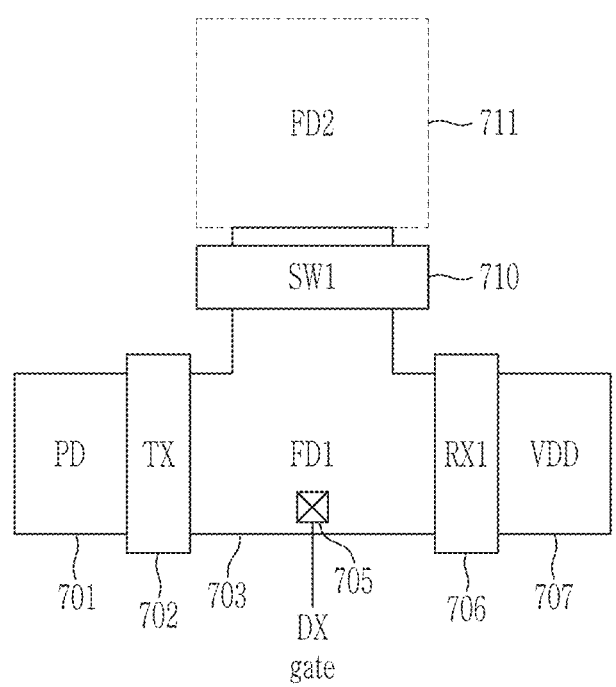
FIG. 8 illustrates a schematic top view of a pixel according to another example embodiment.

FIG. 8 illustrates a schematic top view of a pixel according to another example embodiment.

Specifically, FIG. 8 illustrates a pixel 700 according to an example of the pixel PX1 of FIG. 2. Referring to FIG. 8, one pixel 700 may include a photoelectric element area (PD) 701, a transmission transistor area (TX) 702, a first floating diffusion area (FD1) 703, a contact area 705, a reset transistor area (RX1) 706, a power voltage area (VDD) 707, a switch transistor area (SW1) 710, and a second floating diffusion area (FD2) 711.

In some example embodiments, the pixel 700 may be formed by a DTI process to prevent or hinder electrical and optical crosstalk between adjacent pixels.

The photoelectric element area 701 may include a plurality of photoelectric elements.

The transmission transistor area 702 may have a vertical gate structure extending in a depth direction from a first surface defined as an upper surface of the pixel 700. That is, the transmission transistor area 702 may extend in a depth direction perpendicular to the upper surface of the pixel 700, and may be adjacent to a photoelectric element disposed under the transmission transistor area 702.

The first floating diffusion area 703 may be formed at an opposite side of the photoelectric element area 701 with respect to the transmission transistor area 702. As described above, the charge generated by receiving light from the photoelectric element area 701 may be transferred to the first floating diffusion area 703 through the transmission transistor area 702. Specifically, when a transmission signal is applied to the transmission gate electrode positioned at an upper portion of the transmission transistor area 702 so that a charge transmitting path is formed at a lower portion of the transmission gate electrode, the charge generated by receiving light from the photoelectric element area 701 may be transferred to the floating diffusion area 703 to be accumulated in the first floating diffusion area 703.

The first floating diffusion area 703 may be formed adjacent to the transmission transistor area 702. The first floating diffusion area 703 may include the contact area 705. The contact area 705 may include a driving transistor area. Specifically, a signal generated by the charge accumulated in the first floating diffusion area 703 may be outputted to a wire (DX gate) connected to the second contact area 705.

The reset transistor area 706 may have a vertical gate structure extending in a depth direction from a first surface defined as an upper surface of the pixel 700. That is, the reset transistor area 706 may extend in a depth direction perpendicular to the upper surface of the pixel 700. As described above, when a reset control signal is applied to the reset gate electrode positioned at an upper portion of the reset transistor area 706 so that a charge transmitting path is formed at a lower portion of the reset gate electrode, the first floating diffusion area 703 and the power voltage area 707 are connected, so that the charge accumulated in the first floating diffusion area 703 may be transferred to the power voltage area 707.

The power voltage area 707 may be a conductive area to which a power voltage is supplied.

The switch transistor area 710 may have a vertical gate structure extending in a depth direction from a first surface defined as an upper surface of the pixel 700. That is, the switch transistor area 710 may extend in a depth direction perpendicular to the upper surface of the pixel 700.

The second floating diffusion area 711 may be formed in a silicon layer. The second floating diffusion area 711 may include a silicon layer, and an electrode on the silicon layer. The electrode may be formed of (or alternatively, include)

polysilicon. In the second floating diffusion area 711, the electrode and the silicon layer may be insulated by an insulation layer. The boosting control signal FD_BST may be applied to the electrode.

As described above, when a gain control signal is applied to the switch gate electrode positioned at an upper portion of the switch transistor area 710 so that a charge transmitting path is formed at a lower portion of the switch gate electrode, the first floating diffusion 703 and the second floating diffusion 711 may be connected. In this case, the charges stored in the first floating diffusion area 703 may be divided and accumulated in the first floating diffusion area 703 and the second floating diffusion area 711.

When a transmission signal is applied to the transmission gate electrode while a gain control signal is applied to the switch gate electrode, since the photoelectric element area 701 and the first floating diffusion area 703 are connected, and the first floating diffusion area 703 and the second floating diffusion area 711 are connected, the charge generated in the photoelectric element area 701 may be transferred to the second floating diffusion area 711 through the first floating diffusion area 703.

Depending on the voltage applied to the second floating diffusion area 711, the charge stored in the first floating diffusion area 703 may be transferred to the second floating diffusion area 711 through the switch transistor area 710, or the charge stored in the second floating diffusion 711 may be transferred to the first floating diffusion area 703 through the switch transistor area 710.

Figure 9:
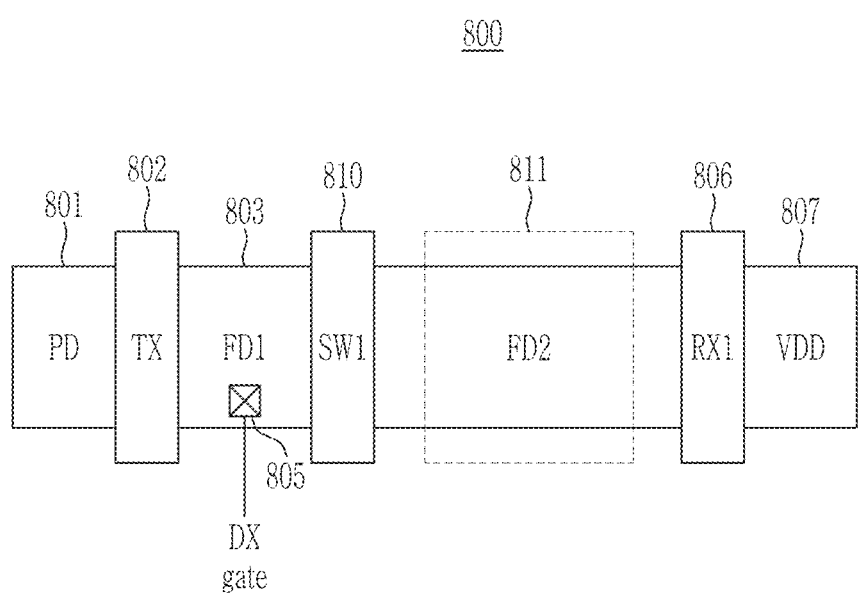
FIG. 9 illustrates a schematic top view of a pixel according to an example embodiment.

FIG. 9 illustrates a schematic top view of a pixel according to an example embodiment.

Specifically, FIG. 9 illustrates a pixel 800 according to an example of the pixel PX1 of FIG. 2. Referring to FIG. 9, one pixel 800 may include a photoelectric element area (PD) 801, a transmission transistor area (TX) 802, a first floating diffusion area (FD1) 803, a contact area 805, a reset transistor area (RX1) 806, a power voltage area (VDD) 807, a switch transistor area (SW1) 810, and a second floating diffusion area (FD2) 811.

In some example embodiments, the pixel 800 may be formed by a DTI process to prevent or hinder electrical and optical crosstalk between adjacent pixels.

The photoelectric element area 801 may include a plurality of photoelectric elements.

The transmission transistor area 802 may have a vertical gate structure extending in a depth direction from a first surface defined as an upper surface of the pixel 800. That is, the transmission transistor area 802 may extend in a depth direction perpendicular to the upper surface of the pixel 800, and may be adjacent to a photoelectric element disposed under the transmission transistor area 802.

The first floating diffusion area 803 may be formed at an opposite side of the photoelectric element area 801 with respect to the transmission transistor area 802. As described above, the charge generated by receiving light from the photoelectric element area 801 may be transferred to the first floating diffusion area 803 through the transmission transistor area 802. Specifically, when a transmission signal is applied to the transmission gate electrode positioned at an upper portion of the transmission transistor area 802 so that a charge transmitting path is formed at a lower portion of the transmission gate electrode, the charge generated by receiving light from the photoelectric element area 801 may be transferred to the floating diffusion area 803 to be accumulated in the first floating diffusion area 803.

The first floating diffusion area 803 may be formed adjacent to the transmission transistor area 802. The first floating diffusion area 803 may include the contact area 805. The contact area 805 may include a driving transistor area. Specifically, a signal generated by the charge accumulated in the first floating diffusion area 803 may be outputted to a wire (DX gate) connected to the contact area 805.

The switch transistor area 810 may have a vertical gate structure extending in a depth direction from a first surface defined as an upper surface of the pixel 800. That is, the switch transistor area 810 may extend in a depth direction perpendicular to the upper surface of the pixel 800.

The second floating diffusion area 811 may be formed in a silicon layer. The second floating diffusion area 811 may include a silicon layer, and an electrode on the silicon layer. The electrode may be formed of (or alternatively, include) polysilicon. In the second floating diffusion area 811, the electrode and the silicon layer may be insulated by an insulation layer. The boosting control signal FD_BST may be applied to the electrode.

When a gain control signal is applied to the switch gate electrode positioned at an upper portion of the switch transistor area 810 so that a charge transmitting path is formed at a lower portion of the switch gate electrode, the first floating diffusion 803 and the second floating diffusion 811 may be connected. In this case, the charge stored in the first floating diffusion area 803 may be transferred to the second floating diffusion area 811.

When a transmission signal is applied to the transmission gate electrode while a gain control signal is applied to the switch gate electrode, since the photoelectric element area 801 and the first floating diffusion area 803 are connected, and the first floating diffusion area 803 and the second floating diffusion area 811 are connected, the charge generated in the photoelectric element area 801 may be transferred to the first floating diffusion area 803 and the second floating diffusion area 811.

The reset transistor area 806 may be formed adjacent to the second floating diffusion area 811. The reset transistor area 806 may have a vertical gate structure extending in a depth direction from a first surface defined as an upper surface of the pixel 800. That is, the reset transistor area 806 may extend in a depth direction perpendicular to the upper surface of the pixel 800. As described above, when a reset control signal is applied to the reset gate electrode positioned at an upper portion of the reset transistor area 806 so that a charge transmitting path is formed at a lower portion of the reset gate electrode, the second floating diffusion area 811 and the power voltage area 807 are connected, so that the charge accumulated in the second floating diffusion area 811 may be transferred to the power voltage area 807.

The power voltage area 807 may be a conductive area to which a power voltage is supplied.

When a reset control signal is applied to the reset gate electrode while a gain control signal is applied to the switch gate electrode, since the first floating diffusion area 803 and the second floating diffusion area 811 are connected, the charges accumulated in the first floating diffusion area 803 and the second floating diffusion area 811 may be transferred to the power voltage area 807.

Meanwhile, the disposition of respective elements described with reference to FIG. 7 to FIG. 9 is not limited to FIG. 7 to FIG. 9, and may be design-changed.

Figure 10:
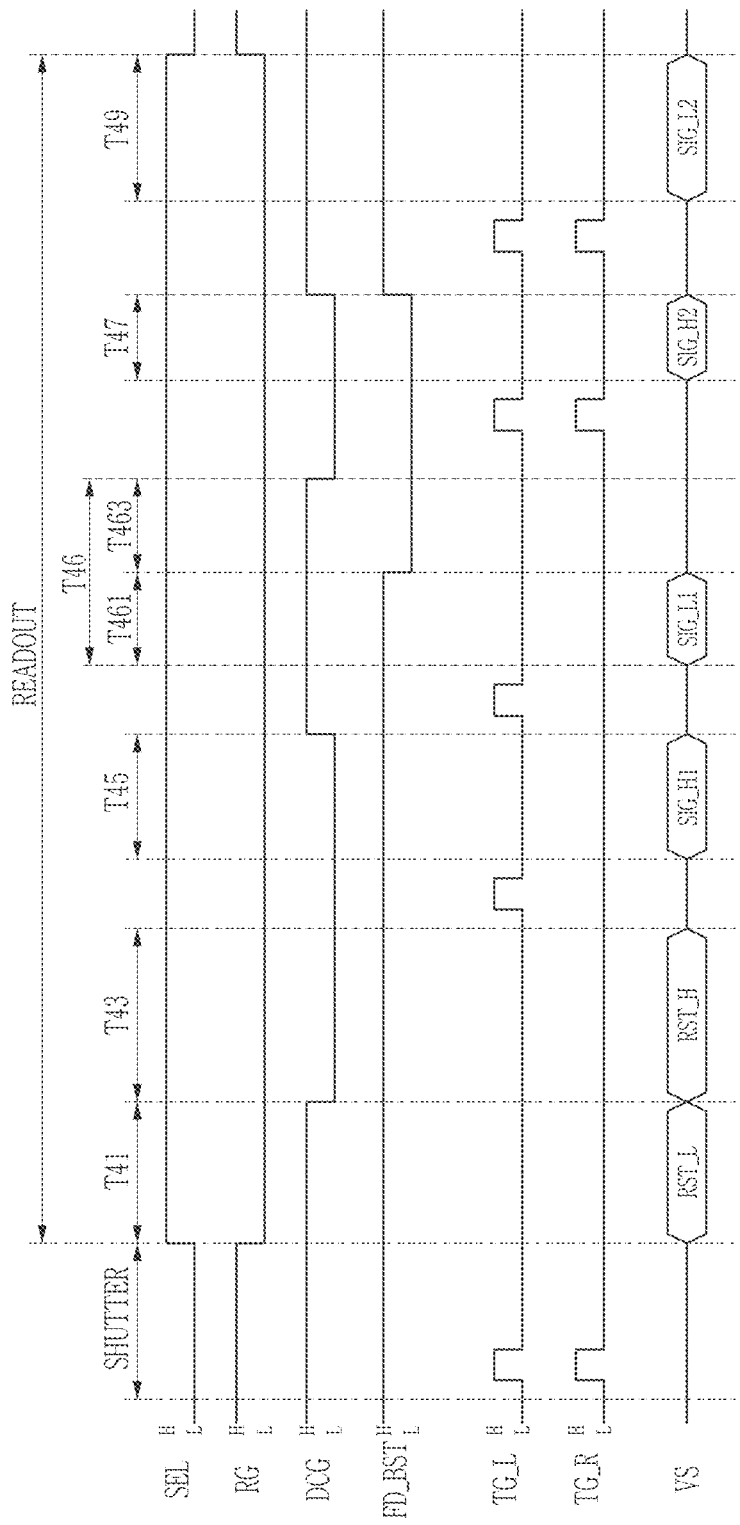
FIG. 10 illustrates an operation timing of the pixel according to FIG. 6 to FIG. 9.

FIG. 10 illustrates an operation timing of the pixel according to FIG. 7 to FIG. 9.

In FIG. 10, a scan period for driving a plurality of pixels in a row line unit may be illustrated. One scan period may sequentially include a shutter period (SHUTTER) and a read period (READOUT).

An operation of a pixel will be described with reference to FIG. 2 and FIG. 10.

The transmission signal TG11 applied to the transmission transistor TX11, the transmission signal TG21 applied to the transmission transistor TX21, the transmission signal TG31 applied to the transmission transistor TX31, and the transmission signal TG41 applied to the transmission transistor TX41 may all have the same waveform, wherein the transmission transistors TX11, TX21, TX31, and TX41 are positioned in the first areas SP1_1, SP2_1, SP3_1, and SP4_1 of respective sub-pixels SP1, SP2, SP3, and SP4, and these are shown as a first transmission signal TG_L in FIG. 10.

In addition, the transmission signal TG12 applied to the transmission transistor TX12, the transmission signal TG22 applied to the transmission transistor TX22, the transmission signal TG32 applied to the transmission transistor TX32, and the transmission signal TG42 applied to the transmission transistor TX42 may all have the same waveform, wherein the transmission transistors TX12, TX22, TX32, and TX42 are positioned in the second areas SP1_2, SP2_2, SP3_2, and SP4_2 of respective sub-pixels SP1, SP2, SP3, and SP4, and these are shown as a second transmission signal TG_R in FIG. 10.

The boosting control signal FD_BST may be a voltage applied to the second floating diffusion FD2. As described above with reference to FIG. 7 to FIG. 9, the second floating diffusion area may be formed in a silicon layer. A voltage of a node connected to the second floating diffusion FD2 may be adjusted by changing a voltage of the boosting control signal FD_BST.

In the shutter period (SHUTTER), the charges stored in the first floating diffusion FD1 and the second floating diffusion FD2 may be reset.

Since an operation of the pixel in the shutter period (SHUTTER) of FIG. 10 is similar to the operation of the pixel in the shutter period (SHUTTER) of FIG. 3, the description of the shutter period (SHUTTER) of FIG. 3 may also be applied the shutter period (SHUTTER) of FIG. 10.

The read period (READOUT) is a period in which the pixel signal VS generated by the pixel PX1 is transmitted to the readout circuit 150. The pixel PX1 may output an LCG reset signal RST_L during a period T41, an HCG reset signal RST_H during a period T43, a first HCG signal SIG_H1 during a period T45, a first LCG signal SIG_L1 during a period T46, a second HCG signal SIG_H2 during a period T47, and a second LCG signal SIG_L2 during the period T49, as the pixel signal VS.

In the read period (READOUT), the conversion gain may be adjusted according to whether the switch transistor SW1 is driven according to the gain control signal DCG. For example, when the switch transistor SW1 is turned off, the pixel PX1 may operate in the HCG mode in which the pixel signal VS is generated based on the charge stored in the first floating diffusion FD1, and when the switch transistor SW1 is turned on, it may operate in the LCG mode in which the pixel signal VS is generated based on the charges stored in the first floating diffusion FD1 and the second floating diffusion FD2.

Meanwhile, since the operation of the pixel PX1 in each of the periods T41, T43, T45, T47, and T49 shown in FIG. 10 is similar to the operation of each of the periods T31, T33, T35, T37, and T39 shown in FIG. 3, the description of the operation of the pixel PX1 described with reference to FIG. 3 and FIG. 4 may also be applied to that of FIG. 10. However, the pixel in FIG. 10 may further output the first LCG signal SIG_L1 as the pixel signal VS in the period T46.

Therefore, herein, only the operation of the pixel PX1 in the period T46 will be described. An operation of the image sensor 100 in the period T46 of the read period (READOUT) will be described with reference to FIG. 11.

Figure 11:
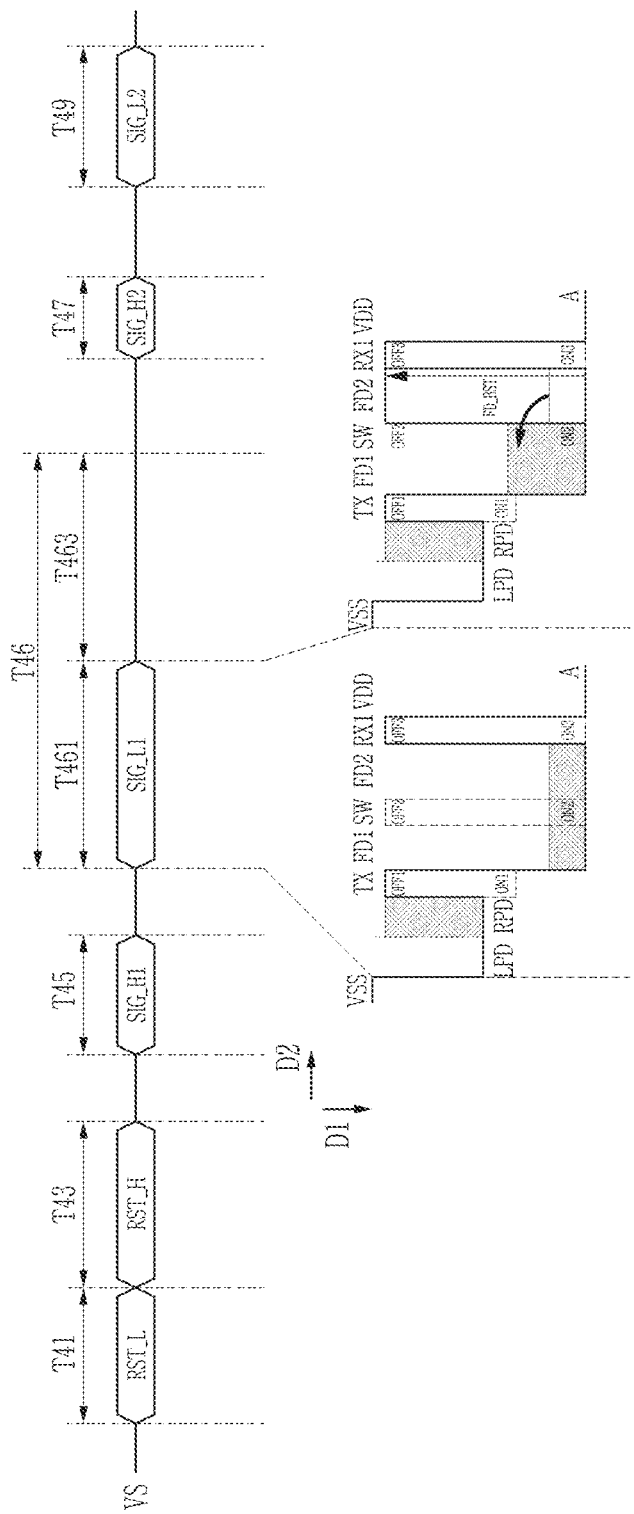
FIG. 11 illustrates a change in a potential level of each channel area within one pixel according to an operation of an image sensor according to FIG. 10.

FIG. 11 illustrates a change in a potential level of each channel area within one pixel according to an operation of an image sensor according to FIG. 10.

The photoelectric elements PD_L1, PD_L2, PD_L3, and PD_L4 positioned in the first areas SP1_1, SP2_1, SP3_1, and SP4_1 of each of the sub-pixels SP1, SP2, SP3, and SP4 in the pixel PX1 are shown as a first photoelectric element LPD. In addition, the photoelectric elements PD_R1, PD_R2, PD_R3, and PD_R4 positioned in the second areas SP1_2, SP2_2, SP3_2, and SP4_2 of each of the sub-pixels SP1, SP2, SP3, and SP4 in the pixel PX1 are shown as a second photoelectric element RPD. Amounts of charges generated by the photoelectric elements LPD and RPD may correspond to areas of hatched portions in areas of the photoelectric elements LPD and RPD of FIG. 11.

For better understanding and ease of description, in FIG. 11, the transmission transistors TX11, TX12, TX21, TX22, TX31, TX32, TX41, and TX42 of each of the sub-pixels SP1, SP2, SP3, and SP4 in the pixel PX1 are shown as one transmission transistor TX area.

FIG. 11 illustrates a potential level of each of the reference voltage VSS, the first photoelectric element LPD area, the second photoelectric element RPD area, the channel area of the transmission transistor TX, the first floating diffusion FD1 area, the switch transistor SW1 area, the second floating diffusion FD2 area, the channel area of the reset transistor RX1, and the power voltage VDD.

In FIG. 11, the potential of each channel is indicated by a height in a D1 direction. In addition, the capacitance of each channel is indicated by a width along a D2 direction.

The potential level of the channel area of the transmission transistor TX may vary between a first potential ON1 and a second potential OFF1 in response to a logic level of the transmission signal TG. The potential level of the channel area of the switch transistor SW1 may vary between a third potential ON2 and a fourth potential OFF2 in response to a logic level of the gain control signal DCG. In addition, the potential level of the channel area of the reset transistor RX1 may vary between a fifth potential ON3 and a sixth potential OFF3 in response to a logic level of the reset signal RG. In addition, the power voltage VDD may have an 'A' potential. In FIG. 11, the second potential OFF1, the fourth potential OFF2, and the sixth potential OFF3 are illustrated as the same potential, but the present invention is not limited thereto, and the second potential OFF1, the fourth potential OFF2, and the sixth potential OFF3 may be different from each other.

After the period T45, the gain control signal DCG of a high level is applied to the switch transistor SW1, so that the first floating diffusion FD1 and the second floating diffusion FD2 may be connected to the floating node FN1. The boosting control signal FD_BST may be maintained at a high level. In addition, the first transmission signal TG_L of a high level is applied to the gates of the transmission transistors TX11, TX21, TX31, and TX41, so that the charges generated by the photoelectric elements PD_L1, PD_L2, PD_L3, and PD_L4, that is, the first photoelectric element LPD may be provided to the first floating diffusion FD1 and the second floating diffusion FD2. Specifically, the charge generated by the first photoelectric element LPD may be transferred to the first floating diffusion FD1 and the second floating diffusion FD2 through the channel area of the transmission transistors TX11, TX21, TX31, and TX41.

Accordingly, the charges stored in the first floating diffusion FD1 and the second floating diffusion FD2 may be changed.

During the period T461, the voltage of the floating node FN1 according to the charge stored in the first floating diffusion FD1 and the second floating diffusion FD2 may be outputted to the column line CL as the pixel signal VS, that is, the first LCG signal SIG_L1 through the driving transistor DX. The first LCG signal SIG_L1 may be a pixel signal according to the charge accumulated in the first floating diffusion FD1 and the second floating diffusion FD2 of the charges generated by the photoelectric elements PD_L1, PD_L2, PD_L3, and PD_L4 positioned at the left sides of respective sub-pixels SP1, SP2, SP3, and SP4 in the pixel PX1. That is, the first LCG signal SIG_L1 may be a left phase signal when the image sensor 100 operates in the LCG mode.

Since the transmission transistor TX is turned off, the transmission transistor TX may have the second potential OFF1. In addition, the charge generated by the first photoelectric element LPD may be stored in the first floating diffusion FD1 and the second floating diffusion FD2. In this case, since the switch transistor SW1 is turned on, it may have the third potential ON2. Since the reset transistor RX1 is turned off, it may have the sixth potential OFF3.

Thereafter, the boosting control signal FDB_BST of the high level is transitioned to the low level, so that the boosting control signal FDB_BST of the low level may be applied to the second floating diffusion FD2.

During the period T463, the charge stored in the second floating diffusion FD2 may be transferred to the first floating diffusion FD1 and the switch transistor area.

Since the transmission transistor TX is turned off, the transmission transistor TX may have the second potential OFF1. The boosting control signal FDB_BST of the low level may be applied to the second floating diffusion FD2 to boost the potential of the second floating diffusion FD2 to a potential lower than the power voltage VDD. As the boosting control signal FDB_BST of the low level is applied to the second floating diffusion FD2, the charge stored in the second floating diffusion FD2 may be transferred to the first floating diffusion FD1. Here, the boosting degree of the boosting control signal FDB_BST may be an appropriate voltage for all of the charges accumulated in the second floating diffusion FD2 to be transferred to the first floating diffusion FD1. In this case, since the switch transistor SW1 is turned on, it may have the third potential ON2. Since the reset transistor RX1 is turned off, it may have the sixth potential OFF3.

Thereafter, the pixel PX1 may output the second HCG signal SIG_H2 in the period T47 and the second LCG signal SIG_L2 in the period T49.

The readout circuit 150 may perform auto-focusing by using the first HCG signal SIG_H1, the first LCG signal SIG_L1, the second HCG signal SIG_H2, and the second LCG signal SIG_L2 that are read during the readout period (READOUT). For example, the readout circuit 150 may obtain a right phase signal when the image sensor 100 operates in the HCG mode by subtracting the first HCG signal SIG_H1 from the second HCG signal SIG_H2. In addition, the readout circuit 150 may obtain a right phase signal when the image sensor 100 operates in the LCG mode by subtracting the first LCG signal SIG_L1 from the second LCG signal SIG_L2.

As described with reference to FIG. 7 to FIG. 9, since the second floating diffusion FD2 formed on the silicon layer is included, it is possible to transfer the charge accumulated in the second floating diffusion FD2 back to the first floating diffusion FD1, so that the charge generated by the first photoelectric element LPD may be stored in the first floating diffusion FD1 and the second floating diffusion FD2 to obtain the first LCG signal SIG_L1, which is the left phase signal, and then the second HCG signal SIG_H2 may be obtained. Accordingly, data for the left and right phase signals for the image sensor 100 may be accurately obtained.

Furthermore, since auto-focusing using the pixel signal VS read by the method according to FIG. 10 uses the accurate left phase signal when driving in the LCG mode, it may have fewer errors than autofocusing when the pixel signal VS read by the method according to FIG. 3 is used.

Figure 12:
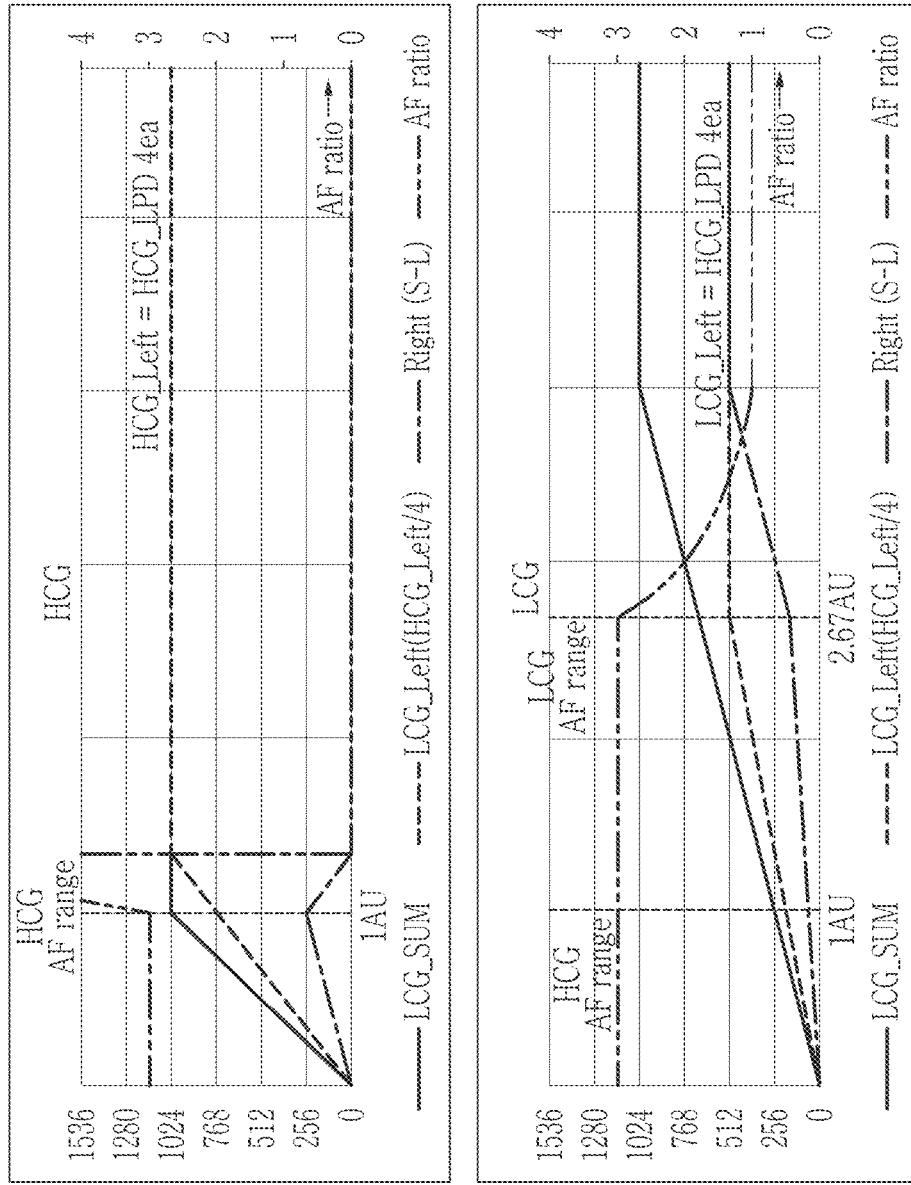
FIG. 12 illustrates an AF graph of the pixel when the pixel according to FIG. 6 to FIG. 9 is driven according to FIG. 10.

FIG. 12 illustrates an AF graph of the pixel when the pixel according to FIG. 7 to FIG. 9 is driven according to FIG. 10.

In FIG. 12, a vertical axis means a code value (for example, 10 bits) corresponding to the charge accumulated in the first floating diffusion FD1, and a horizontal axis may mean illuminance.

In the HCG mode, the first floating diffusion FD1 may be saturated by an illuminance of 1 AU. When the first floating diffusion FD1 is saturated, a charge corresponding to a code value of 1024 may be stored in the first floating diffusion FD1. A range of the auto-focus (AF) may be expressed as an illuminance range in which the magnitude of the left phase signal and the magnitude of the right phase signal satisfy a predetermined (or alternatively, desired) ratio (for example, 3:1). Accordingly, 1 AU in which the code value of the left phase signal by the first photoelectric element LPD is 768 and the code value of the right phase signal is 256 may be the AF range in the HCG mode.

In the LCG mode, the first floating diffusion FD1 and the second floating diffusion FD2 may be saturated by the illuminance of 4 AU. When the pixel according to FIG. 7 to FIG. 9 is driven according to FIG. 10, the left phase signal in the LCG mode may be actually obtained. A charge corresponding to a code value of 512 may be stored in the first floating diffusion FD1 and the second floating diffusion FD1 by the left phase signal in the LCG mode. The magnitude of the right phase signal in the LCG mode in which the magnitude of the left phase signal and the magnitude of the right phase signal satisfy 3:1 may be calculated as 170.6. Accordingly, 2.67 AU in which the code value of the left phase signal by the first photoelectric element LPD is 512 and the code value of the right phase signal is 170.6 may be the AF range in the LCG mode.

In the AF graph shown in FIG. 5, the AF range in the LCG mode may be 1.33 AU. On the other hand, in the AF graph shown in FIG. 12, the AF range in the LCG mode may be 2.67 AU.

As shown in FIG. 5 and FIG. 12, in FIG. 5, the AF range obtained by using the left phase signal in the LCG mode calculated through the left phase signal in the HCG mode is 1.33 AU, but in FIG. 12, since the AF range obtained by using the left phase signal in the actual LCG mode is 2.67 AU, it may have the advantage of being able to obtain a more accurate and wider AF range.

Figure 13:
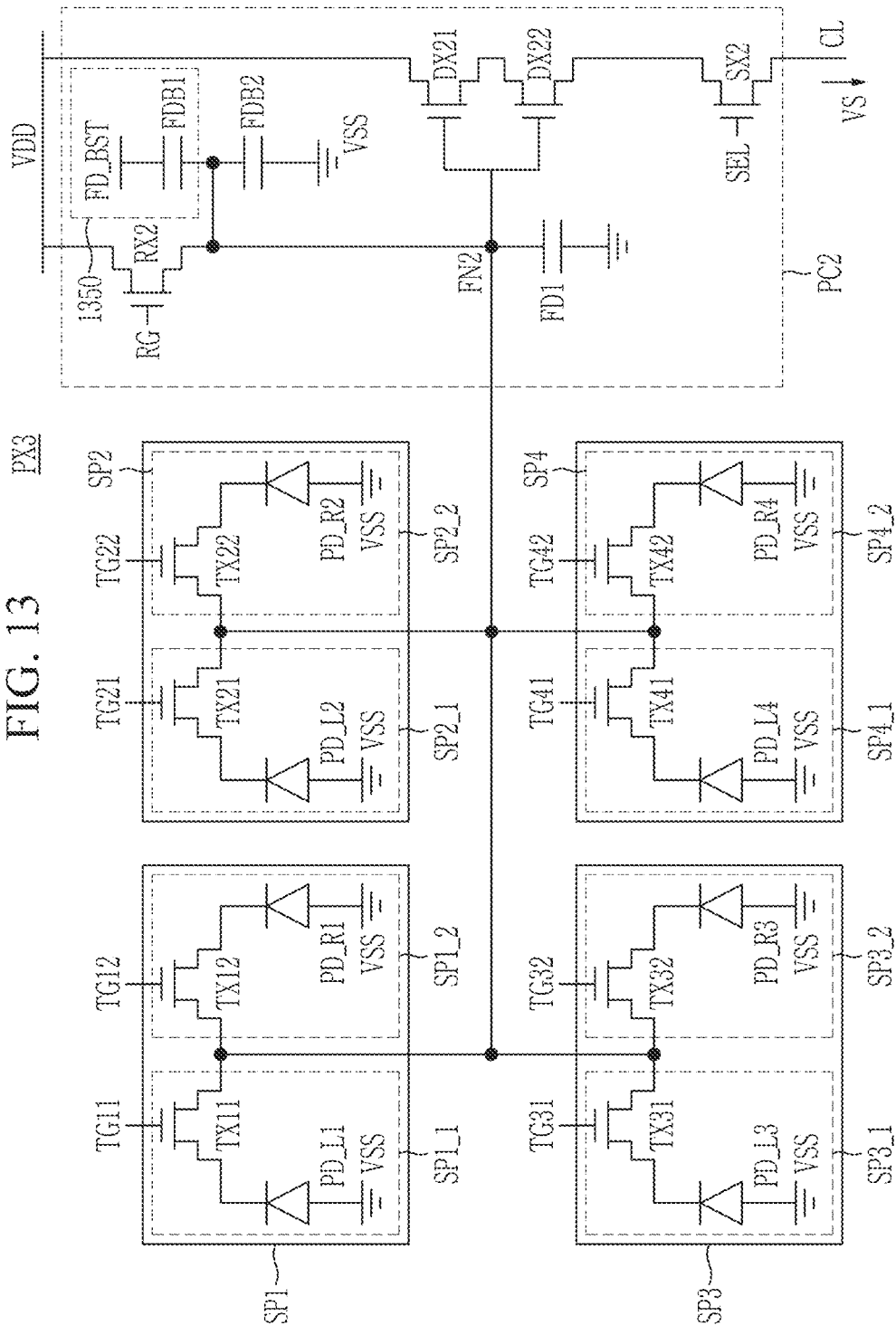
FIG. 13 illustrates a circuit diagram of a pixel according to an example embodiment.

FIG. 13 illustrates a circuit diagram of a pixel according to an example embodiment.

Referring to FIG. 13, a pixel PX3 may include a first sub-pixel SP1, a second sub-pixel SP2, a third sub-pixel SP3, and a fourth sub-pixel SP4.

Since the first to fourth sub-pixels SP1 to SP4 have a configuration similar to or the same as the first to fourth sub-pixels SP1 to SP4 in FIG. 2, the description of the first to fourth sub-pixels SP1 to SP4 in FIG. 2 may also be applied to FIG. 13.

The pixel PX3 according to the example embodiment may include a pixel circuit PC2 that outputs an electrical signal by processing a charge generated by the photoelectric element (PD_L1, PD_R1, PD_L2, PD_R2, PD_L3, PD_R3, PD_L4, or PD_R4) that generates the charge in response to light.

Specifically, the pixel circuit PC2 may include driving transistors DX21 and DX22, and selection transistors SX2 and reset transistor RX2. Transistors DX21, DX22, RX2, and SX2 in the pixel circuit PC2 may respond to control signals provided from the row driver 130, for example a selection signal SEL and a reset control signal RG to operate. In some example embodiments, the selection signal SEL and the reset control signal RG may be transmitted through different lines among corresponding row lines.

In some example embodiments, the pixel circuit PC2 may include a plurality of floating diffusions FD1 and FD2. Each of the plurality of floating diffusions FD1 and FD2 may have a predetermined (or alternatively, desired) capacitance, and may store charges generated by the photoelectric elements in the plurality of sub-pixels SP1, SP2, SP3, and SP4. For example, the plurality of floating diffusions FD1 and FD2 may be configured as capacitors. Although two floating diffusions FD1 and FD2 are illustrated in FIG. 13, the pixel circuit PC2 may have three or more floating diffusions.

In some example embodiment, when a boosting control signal FD_BST is applied to a silicon layer of the floating diffusion FD2, the pixel PX3 may further include a boosting area 1350. However, when the boosting control signal FD_BST is not applied to the floating diffusion FD2, the pixel PX3 may not include the boosting area 1350. The boosting area 1350 may include a parasitic electrode FDB2 generated when the boosting control signal FD_BST is applied. That is, in the floating diffusion FD2 of FIG. 13, the silicon layer itself may operate as a capacitor having capacitance, and the boosting control signal FD_BST may be applied to the silicon layer of the floating diffusion FD2 including the parasitic electrode FDB2, so that the potential of the floating diffusion FD2 may be changed by the boosting control signal FD_BST. Gates of the driving transistors DX21 and DX22 may be connected to the floating node FN2. The driving transistors DX21 and DX22 may operate as a source-follower amplifier that transmits a voltage of the floating node FN2 to the selection transistor SX2. The driving transistors DX21 and DX22 may output a pixel signal to the column line CL through the selection transistor SX2 in response to the voltage of the floating node FN2.

The selection transistor SX2 may be connected between the driving transistors DX21 and DX22 and the column line CL to be controlled by the selection signal SEL. When the selection transistor SX2 is turned on, a pixel voltage VS outputted from the driving transistors DX21 and DX22 may be outputted to the readout circuit (150 in FIG. 1) through the column line CL connected to the selection transistor SX2.

The reset transistor RX2 is connected between a power voltage line supplying a power voltage VDD and the floating node FN2, and may be controlled by the reset control signal RG. The reset transistor RX2 may be used to reset (or initialize) an internal voltage (or current) of the pixel PX3. When the reset transistor RX2 is turned on by the reset signal RG, and when each of the transmission transistors TX11, TX12, TX21, TX22, TX31, TX32, TX41, and TX42 are turned on, all voltages of the floating node FN2 and the photoelectric elements may be reset by the power voltage VDD.

Figure 14:
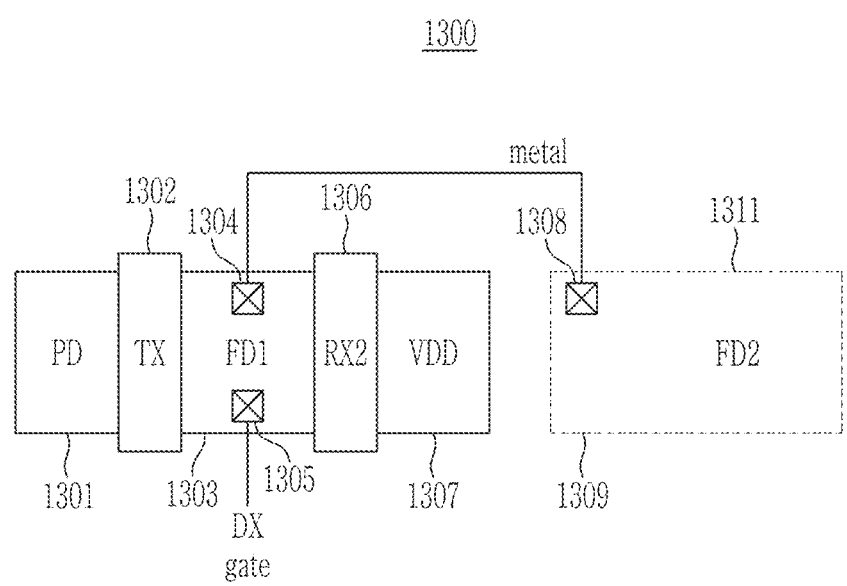
FIG. 14 illustrates a schematic top view of a pixel according to an example embodiment.

FIG. 14 illustrates a schematic top view of a pixel according to an example embodiment.

Specifically, FIG. 14 illustrates a pixel 1300 according to an example of the pixel PX3 of FIG. 13. Referring to FIG. 14, one pixel 1300 may include a photoelectric element area (PD) 1301, a transmission transistor area (TX) 1302, a first floating diffusion area (FD1) 1303, a plurality of contact areas 1304, 1305, and 1308, a reset transistor area (RX2) 1306, a power voltage area (VDD) 1307, and a second floating diffusion area (FD2) 1311.

In some example embodiments, the pixel 1300 may be formed by a DTI process to prevent or hinder electrical and optical crosstalk between adjacent pixels.

The photoelectric element area 1301 may include a plurality of photoelectric elements.

The transmission transistor area 1302 may have a vertical gate structure extending in a depth direction from a first surface defined as an upper surface of the pixel 1300. That is, the transmission transistor area 1302 may extend in a depth direction perpendicular to the upper surface of the pixel 1300, and may be adjacent to a photoelectric element disposed under the transmission transistor area 1302.

The first floating diffusion area 1303 may be formed at an opposite side of the photoelectric element area 1301 with respect to the transmission transistor area 1302. As described above, the charge generated by receiving light from the photoelectric element area 1301 may be transferred to the first floating diffusion area 1303 through the transmission transistor area 1302. Specifically, when a transmission signal is applied to the transmission gate electrode positioned at an upper portion of the transmission transistor area 1302 so that a charge transmitting path is formed at a lower portion of the transmission gate electrode, the charge generated by receiving light from the photoelectric element area 1301 may be transferred to the floating diffusion area 1303 to be accumulated in the first floating diffusion area 1303.

The first floating diffusion area 1303 may be formed adjacent to the transmission transistor area 1302. The first floating diffusion area 1303 may include a plurality of contact areas 1304 and 1305. The first contact area 1304 may be electrically connected to the second floating diffusion area 1311 through a metal wire (metal) and the third contact area 1308. Accordingly, the first floating diffusion area 1303 and the second floating area 1311 are areas physically separated from each other, and in an equivalent circuit, as shown in FIG. 13, these may provide one node.

The second contact area 1305 may include a driving transistor area. Specifically, a signal generated by the charge accumulated in the first floating diffusion area 1303 may be outputted to a wire (DX gate) connected to the second contact area 1305.

The reset transistor area 1306 may have a vertical gate structure extending in a depth direction from a first surface defined as an upper surface of the pixel 1300. That is, the reset transistor area 1306 may extend in a depth direction perpendicular to the upper surface of the pixel 1300. As described above, when a reset control signal is applied to the reset gate electrode positioned at an upper portion of the reset transistor area 1306 so that a charge transmitting path is formed at a lower portion of the reset gate electrode, the first floating diffusion area 1303 and the power voltage area 1307 are connected, so that the charge accumulated in the first floating diffusion area 1303 may be transferred to the power voltage area 1307.

The power voltage area 1307 may be a conductive area to which a power voltage is supplied.

The second floating diffusion area 1311 may be formed in a silicon layer. The second floating diffusion area 1311 may include a silicon layer, and an electrode on the silicon layer. The electrode may be formed of (or alternatively, include) polysilicon. In the second floating diffusion area 1311, the electrode and the silicon layer may be insulated by an insulation layer. The boosting control signal FD_BST may be applied to the electrode.

The charge stored in the first floating diffusion area 1303 may be transferred to the second floating diffusion area 1311 through the metal wire (metal) to be accumulated in the second floating diffusion area 1311.

When a transmission signal is applied to the transmission gate electrode, since the photoelectric element area 1301 and the first floating diffusion area 1303 are connected, and the first floating diffusion area 1303 and the second floating diffusion area 1311 are connected through the metal wire (metal), the charge generated in the photoelectric element area 1301 may be transferred to the second floating diffusion area 1311 through the metal wire (metal).

Depending on the voltage applied to the second floating diffusion area 1311, the charge stored in the first floating diffusion area 1303 may be transferred to the second floating diffusion area 1311 through the metal wire (metal), or the charge stored in the second floating diffusion 1311 may be transferred to the first floating diffusion area 1303 through the metal wire (metal).

Figure 15:
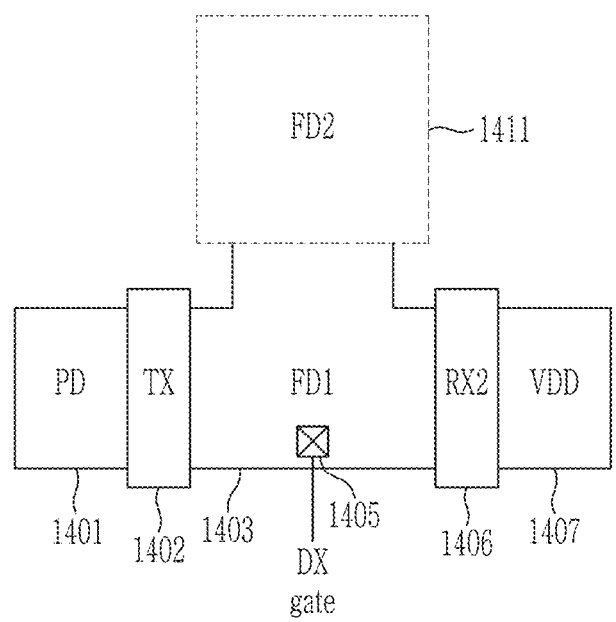
FIG. 15 illustrates a schematic top view of a pixel according to another example embodiment.

FIG. 15 illustrates a schematic top view of a pixel according to another example embodiment.

Specifically, FIG. 15 illustrates a pixel 1400 according to an example of the pixel PX1 of FIG. 2. Referring to FIG. 15, one pixel 1400 may include a photoelectric element area (PD) 1401, a transmission transistor area (TX) 1402, a first floating diffusion area (FD1) 1403, a contact area 1405, a reset transistor area (RX2) 1406, a power voltage area (VDD) 1407, a switch transistor area (SW1) 1410, and a second floating diffusion area (FD2) 1411.

In some example embodiments, the pixel 1400 may be formed by a DTI process to prevent or hinder electrical and optical crosstalk between adjacent pixels.

The photoelectric element area 1401 may include a plurality of photoelectric elements.

The transmission transistor area 1402 may have a vertical gate structure extending in a depth direction from a first surface defined as an upper surface of the pixel 1400. That is, the transmission transistor area 1402 may extend in a depth direction perpendicular to the upper surface of the pixel 1400, and may be adjacent to a photoelectric element disposed under the transmission transistor area 1402.

The first floating diffusion area 1403 may be formed at an opposite side of the photoelectric element area 1401 with respect to the transmission transistor area 1402. As described above, the charge generated by receiving light from the photoelectric element area 1401 may be transferred to the first floating diffusion area 1403 through the transmission transistor area 1402. Specifically, when a transmission signal is applied to the transmission gate electrode positioned at an upper portion of the transmission transistor area 1402 so that a charge transmitting path is formed at a lower portion of the transmission gate electrode, the charge generated by receiving light from the photoelectric element area 1401 may be transferred to the floating diffusion area 1403 to be accumulated in the first floating diffusion area 1403.

The first floating diffusion area 1403 may be formed adjacent to the transmission transistor area 1402. The first floating diffusion area 1403 may include the contact area 1405. The contact area 1405 may include a driving transistor area. Specifically, a signal generated by the charge accumulated in the first floating diffusion area 1403 may be outputted to a wire (DX gate) connected to the second contact area 1405.

The reset transistor area 1406 may have a vertical gate structure extending in a depth direction from a first surface defined as an upper surface of the pixel 1400. That is, the reset transistor area 1406 may extend in a depth direction perpendicular to the upper surface of the pixel 1400. As described above, when a reset control signal is applied to the reset gate electrode positioned at an upper portion of the reset transistor area 1406 so that a charge transmitting path is formed at a lower portion of the reset gate electrode, the first floating diffusion area 1403 and the power voltage area 1407 are connected, so that the charge accumulated in the first floating diffusion area 1403 may be transferred to the power voltage area 1407.

The power voltage area 1407 may be a conductive area to which a power voltage is supplied.

The second floating diffusion area 1411 may be formed in a silicon layer. The second floating diffusion area 1411 may include a silicon layer, and an electrode on the silicon layer. The electrode may be formed of (or alternatively, include) polysilicon. In the second floating diffusion area 1411, the electrode and the silicon layer may be insulated by an insulation layer. The boosting control signal FD_BST may be applied to the electrode.

When a transmission signal is applied to the transmission gate electrode, since the photoelectric element area 1401 and the first floating diffusion area 1403 are connected, and the first floating diffusion area 1403 and the second floating diffusion area 1411 are connected, the charge generated in the photoelectric element area 1401 may be transferred to the second floating diffusion area 1411 through the first floating diffusion area 1403.

Depending on the voltage applied to the second floating diffusion area 1411, the charge stored in the first floating diffusion area 1403 may be transferred to the second floating diffusion area 1411, or the charge stored in the second floating diffusion 1411 may be transferred to the first floating diffusion area 1403 through the switch transistor area 1410.

Figure 16:
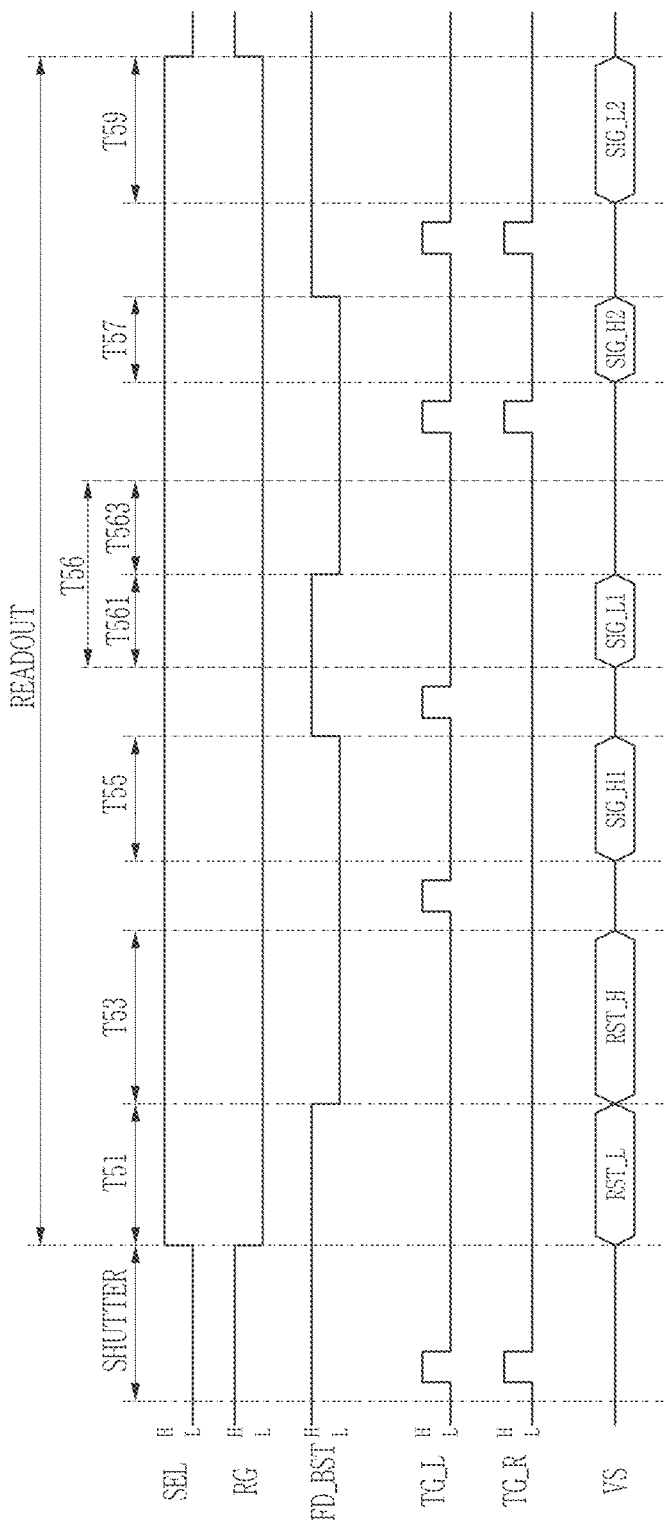
FIG. 16 illustrates an operation timing of the pixel according to FIG. 13.

FIG. 16 illustrates an operation timing of the pixel according to FIG. 13.

In FIG. 16, a scan period for driving a plurality of pixels in a row line unit may be illustrated. One scan period may sequentially include a shutter period (SHUTTER) and a read period (READOUT).

An operation of a pixel will be described with reference to FIG. 13 and FIG. 16.

The transmission signal TG11 applied to the transmission transistor TX11, the transmission signal TG21 applied to the transmission transistor TX21, the transmission signal TG31 applied to the transmission transistor TX31, and the transmission signal TG41 applied to the transmission transistor TX41 may all have the same waveform, wherein the transmission transistors TX11, TX21, TX31, and TX41 are positioned in the first areas SP1_1, SP2_1, SP3_1, and SP4_1 of respective sub-pixels SP1, SP2, SP3, and SP4, and these are shown as a first transmission signal TG_L in FIG. 16.

In addition, the transmission signal TG12 applied to the transmission transistor TX12, the transmission signal TG22 applied to the transmission transistor TX22, the transmission signal TG32 applied to the transmission transistor TX32, and the transmission signal TG42 applied to the transmission transistor TX42 may all have the same waveform, wherein the transmission transistors TX12, TX22, TX32, and TX42 are positioned in the second areas SP1_2, SP2_2, SP3_2, and SP4_2 of respective sub-pixels SP1, SP2, SP3, and SP4, and they are shown as a second transmission signal TG_R in FIG. 16.

In the shutter period (SHUTTER), the charges stored in the first floating diffusion FD1 and the second floating diffusion FD2 may be reset.

Specifically, the boosting control signal FD_BST is at a high level, and accordingly, the second floating diffusion FD2 has the same potential as the first floating diffusion FD1, so that the first floating diffusion FD1 and the second floating diffusion FD2 may be connected to the floating node FN2.

The first and second transmission signals TG_L and TG_R of a high level are applied to the gates of the transmission transistors TX11, TX12, TX21, TX22, TX31, TX32, TX41, and TX42, respectively, so that the transmission transistors TX11, TX12, TX21, TX22, TX31, TX32, TX41, and TX42 may be turned on. In this case, the charge generated by the photoelectric elements PD_L1, PD_R1, PD_L2, PD_R2, PD_L3, PD_R3, PD_L4, and PD_R4 may be provided to the first floating diffusion FD1 and the second floating diffusion FD2. The reset signal RG of a high level is applied to the gate of the reset transistor RX1 within the shutter period (SHUTTER), so that the reset transistor RX1 may be turned on. Then, the power voltage VDD is supplied to the floating node FN2, so that the first floating diffusion FD1 and the second floating diffusion FD2 may be reset. In some example embodiments, the reset voltage may be, for example, the power voltage VDD. In this case, the selection signal SEL of a low level may be applied to the selection transistor SX1, so that the selection transistor SX1 may be turned off.

Thereafter, the first transmission signal TG_L and the second transmission signal TG_R are transitioned from the high level to the low level, so that the transmission transistors TX11, TX12, TX21, TX22, TX31, TX32, TX41, and TX42 may be turned off. During that, the photoelectric elements PD_L1, PD_R1, PD_L2, PD_R2, PD_L3, PD_R3, PD_L4, and PD_R4 may be exposed to light, so that a charge may be generated.

The read period (READOUT) is a period in which the pixel signal VS generated by the pixel PX3 is transmitted to the readout circuit 150. The pixel PX3 may output an LCG reset signal RST_L during a period T51, an HCG reset signal RST_H during a period T53, a first HCG signal SIG_H1 during a period T55, a first LCG signal SIG_L1 during a period T56, a second HCG signal SIG_H2 during a period T57, and a second LCG signal SIG_L2 during the period T59, as the pixel signal VS.

The conversion gain may be adjusted according to the voltage of the boosting control signal FD_BST. For example, when the boosting control signal FD_BST of a high level is applied to the second floating diffusion FD2, the charges of the first floating diffusion FD1 and the second first floating diffusion FD1 may be moved. Accordingly, the pixel PX3 may operate in the LCG mode for generating the pixel signal VS based on the charges stored in the first floating diffusion FD1 and the second floating diffusion FD2. In addition, when the boosting control signal FD_BST of a low level is applied to the second floating diffusion FD2, the movement of the charges of the first floating diffusion FD1 and the second first floating diffusion FD1 may be blocked. Accordingly, the pixel PX3 may operate in the HCG mode for generating the pixel signal VS based on the charge stored in the first floating diffusion FD1.

An operation of the image sensor 100 in the readout period (READOUT) will be described with reference to FIG. 17.

Figure 17:
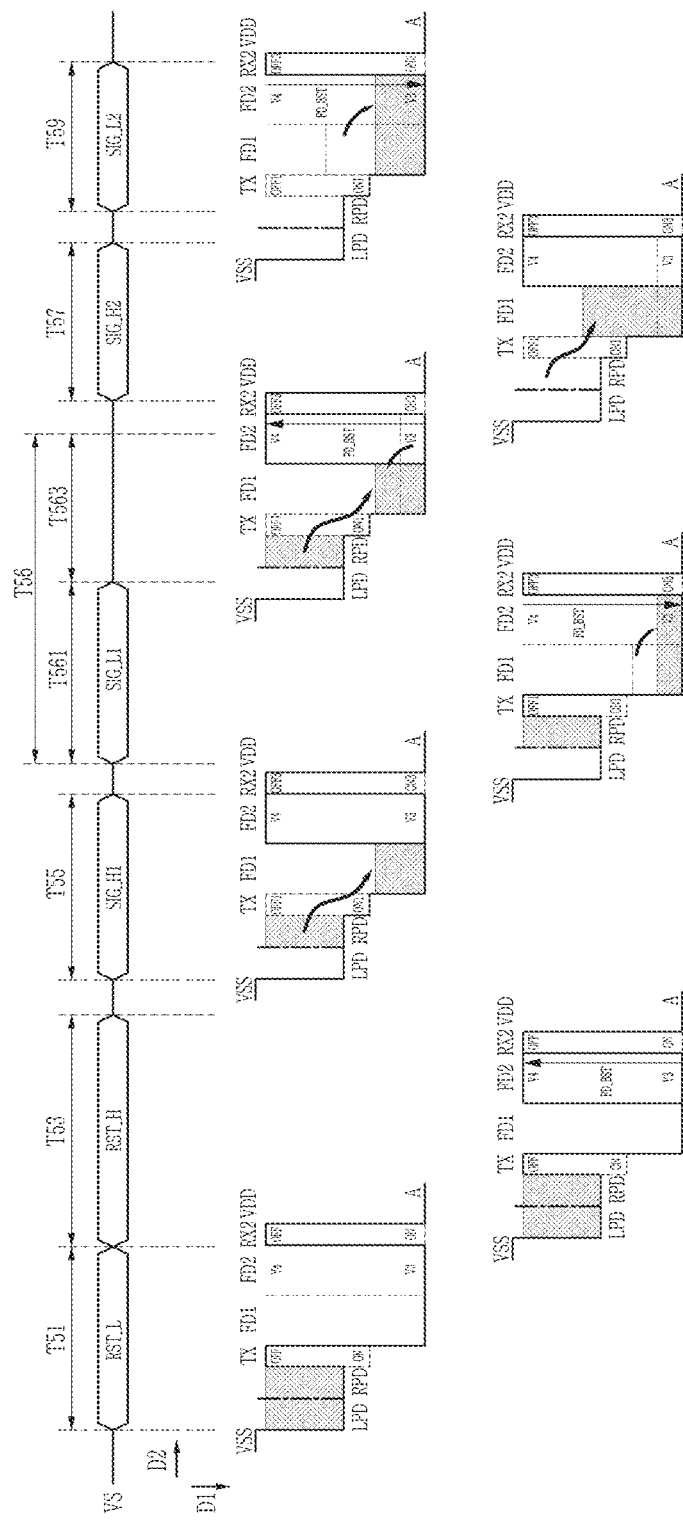
FIG. 17 illustrates a change in a potential level of each channel area within one pixel according to an operation of an image sensor according to FIG. 16.

FIG. 17 illustrates a change in a potential level of each channel area within one pixel according to an operation of an image sensor according to FIG. 16. The photoelectric elements PD_L1, PD_L2, PD_L3, and PD_L4 positioned in the first areas SP1_1, SP2_1, SP3_1, and SP4_1 of each of the sub-pixels SP1, SP2, SP3, and SP4 in the pixel PX3 are shown as a first photoelectric element LPD. In addition, the photoelectric elements PD_R1, PD_R2, PD_R3, and PD_R4 positioned in the second areas SP1_2, SP2_2, SP3_2, and SP4_2 of each of the sub-pixels SP1, SP2, SP3, and SP4 in the pixel PX3 are shown as a second photoelectric element RPD. Amounts of charges generated by the photoelectric elements LPD and RPD may correspond to areas of hatched portions in areas of the photoelectric elements LPD and RPD of FIG. 17.

For better understanding and ease of description, in FIG. 17, the transmission transistors TX11, TX12, TX21, TX22, TX31, TX32, TX41, and TX42 of each of the sub-pixels SP1, SP2, SP3, and SP4 in the pixel PX3 are shown as one transmission transistor TX area.

FIG. 17 illustrates a potential level of each of the reference voltage VSS, the first photoelectric element LPD area, the second photoelectric element RPD area, the channel area of the transmission transistor TX, the first floating diffusion FD1 area, the second floating diffusion FD2 area, the channel area of the reset transistor RX1, and the power voltage VDD.

In FIG. 17, the potential of each channel is indicated by a height in a D1 direction. In addition, the capacitance of each channel is indicated by a width along a D2 direction.

The potential level of the channel area of the transmission transistor TX2 may vary between a first potential ON1 and a second potential OFF1 in response to a logic level of the transmission signal TG. The second floating diffusion FD2 may vary between a third potential V3 and a fourth potential V4 in response to the boosting control signal FD_BST. In addition, the potential level of the channel area of the reset transistor RX1 may vary between a fifth potential ON3 and a sixth potential OFF3 in response to a logic level of the reset signal RG. In addition, the power voltage VDD may have an 'A' potential. In FIG. 4, the second potential OFF1, the fourth potential V4, and the sixth potential OFF3 are illustrated as the same potential, but the present invention is not limited thereto, and the second potential OFF1, the fourth potential V4, and the sixth potential OFF3 may be different from each other.

The selection signal SEL of a high level may be applied to the gate of the selection transistor SX1, so that the selection transistor SX1 may be turned on. In addition, since the boosting control signal FD_BST is at a high level, the second floating diffusion FD2 may have the third potential V3. Accordingly, the first floating diffusion FD1 and the second floating diffusion FD2 may be connected at the floating node FN2.

During the period T51, the voltage of the floating node FN2 according to the charge stored in the first floating diffusion FD1 and the second floating diffusion FD2 may be outputted to the column line CL as the pixel signal VS, that is, the LCG reset signal RST_L, through the driving transistors DX21 and DX22.

Since the transmission transistor TX is turned off, the transmission transistor TX may have the second potential OFF1. Accordingly, the charges accumulated in the first photoelectric element LPD and the second photoelectric element RPD cannot be transferred to the first floating diffusion FD1. Meanwhile, since the reset transistor RX2 is turned off, the reset transistor RX2 may have the sixth potential OFF3.

Next, the boosting control signal FD_BST may be transitioned to a low level, so that the second floating diffusion FD2 may have the fourth potential V4. Accordingly, charge movement between the first floating diffusion FD1 and the second floating diffusion FD2 may become impossible.

During the period T53, the voltage of the floating node FN2 according to the charge stored in the first floating diffusion FD1 may be outputted to the column line CL as the pixel signal VS, that is, the HCG reset signal RST_H, through the driving transistors DX11 and DX12.

Since the transmission transistor TX is turned off, the transmission transistor TX may have the second potential OFF1. Accordingly, the charges accumulated in the first photoelectric element LPD and the second photoelectric element RPD cannot be transferred to the first floating diffusion FD1. In this case, since the reset transistor RX1 is turned off, the reset transistor RX2 may have the sixth potential OFF3.

Thereafter, the first transmission signal TG_L of a high level is applied to the gates of the transmission transistors TX11, TX21, TX31, and TX41, so that the charges generated by the photoelectric elements PD_L1, PD_L2, PD_L3, and PD_L4, that is, the first photoelectric element LPD may be provided to the first floating diffusion FD1. Specifically, the charge generated by the first photoelectric element LPD may be transferred to the first floating diffusion FD1 through the channel area of the transmission transistors TX11, TX21, TX31, and TX41. Accordingly, the amount of the charge stored in the first floating diffusion FD1 may be changed.

During the period T55, the voltage of the floating node FN2 according to the charge stored in the changed first floating diffusion FD1 may be outputted to the column line CL as the pixel signal VS, that is, the first HCG signal SIG_H1, through the driving transistors DX21 and DX22. The first HCG signal SIG_H1 may be a pixel signal according to the charge accumulated in the first floating diffusion FD1 of the charges generated by the photoelectric elements PD_L1, PD_L2, PD_L3, and PD_L4 positioned at the left sides of respective sub-pixels SP1, SP2, SP3, and SP4 in the pixel PX1. That is, the first HCG signal SIG_H1 may be a left phase signal obtained by sensing a left side image of the object (OBJECT) when the image sensor 100 operates in the HCG mode.

Since the transmission transistor TX is turned off, the transmission transistor TX may have the second potential OFF1. In addition, the charge generated by the first photoelectric element LPD may be stored in the first floating diffusion FD1. In this case, since the reset transistor RX1 is turned off, the reset transistor RX1 may have the sixth potential OFF3.

In addition, the boosting control signal FD_BST of a high level may be applied to the second floating diffusion FD2, so that the second floating diffusion FD2 may have the third potential V3. Accordingly, charge movement between the first floating diffusion FD1 and the second floating diffusion FD2 may be possible. In addition, the first transmission signal TG_L of a high level is applied to the gates of the transmission transistors TX11, TX21, TX31, and TX41, so that the charges generated by the photoelectric elements PD_L1, PD_L2, PD_L3, and PD_L4, that is, the first photoelectric element LPD may be provided to the first floating diffusion FD1 and the second floating diffusion FD2.

During the period T561, the voltage of the floating node FN2 according to the charge stored in the first floating diffusion FD1 and the second floating diffusion FD2 may be outputted to the column line CL as the pixel signal VS, that is, the first LCG signal SIG_L1, through the driving transistors DX21 and DX22. The first LCG signal SIG_L1 may be a pixel signal according to the charge accumulated in the first floating diffusion FD1 and the second floating diffusion FD2 of the charges generated by the photoelectric elements positioned at the left sides of respective sub-pixels SP1, SP2, SP3, and SP4 in the pixel PX3. That is, the first LCG signal SIG_L1 may be a left phase signal obtained by sensing a left side image of the object (OBJECT) when the image sensor 100 operates in the LCG mode.

Since the transmission transistor TX is turned off, the transmission transistor TX may have the second potential OFF1. In addition, the charge generated by the first photoelectric element LPD may be stored in the first floating diffusion FD1 and the second floating diffusion FD2. In this case, since the reset transistor RX2 is turned off, the reset transistor RX1 may have the sixth potential OFF3.

Thereafter, the boosting control signal FD_BST of a high level may transition to a low level. The boosting control signal FD_BST of the low level is applied to the second floating diffusion FD2, so that the second floating diffusion FD2 may have the fourth potential V4. Accordingly, the charges divided and stored in the first floating diffusion FD1 and the second floating diffusion FD2 may be transferred to the first floating diffusion FD1. That is, all of the charges generated by the first photoelectric element LPD may be transferred to the first floating diffusion FD1.

Since the transmission transistor TX is turned off, the transmission transistor TX may have the second potential OFF1. The charge generated by the first photoelectric element LPD may be stored in the first floating diffusion FD1. In this case, since the reset transistor RX2 is turned off, the reset transistor RX1 may have the sixth potential OFF3.

Thereafter, the first transmission signal TG_L of the high level and the second transmission signal TG_R of the high level are applied to the gates of the transmission transistors TX11, TX12, TX21, TX22, TX31, TX32, TX41, and TX42, so that the charges generated by the photoelectric elements PD_L1, PD_R1, PD_L2, PD_R2, PD_L3, PD_R3, PD_L4, and PD_R4, that is, the charges not transferred to the first floating diffusion FD1 among the charges generated by the first photoelectric element LPD and the charges generated by the second photoelectric element RPD, may be provided to the first floating diffusion FD1. Specifically, the charge generated by the first photoelectric element LPD may be transferred to the first floating diffusion FD1 through the channel areas of the transmission transistors TX11, TX21, TX31, and TX41, and the charge generated by the second photoelectric element RPD may be transferred to the first floating diffusion FD1 through the channel areas of the transmission transistors TX12, TX22, TX32, and TX42. Accordingly, the charge stored in the first floating diffusion FD1 may be changed.

During the period T57, the voltage of the floating node FN2 according to the charge stored in the first floating diffusion FD1 may be outputted to the column line CL as the pixel signal VS, that is, the second HCG signal SIG_H2, through the driving transistors DX21 and DX22. The second HCG signal SIG_H2 be a pixel signal according to the charge accumulated in the first floating diffusion FD1, among the charges generated by the photoelectric elements PD_L1, PD_L2, PD_L3, and PD_L4 positioned at the left sides of respective sub-pixels SP1, SP2, SP3, and SP4 in the pixel PX1 and the charges generated by the photoelectric elements PD_R1, PD_R2, PD_R3, and PD_R4 positioned at the right sides of respective sub-pixels SP1, SP2, SP3, and SP4 in the pixel PX3. That is, the second HCG signal SIG_H2 may be a signal obtained by adding the right phase signal to the left phase signal when the image sensor 100 operates in the HCG mode.

Since the transmission transistor TX is turned off, the transmission transistor TX may have the second potential OFF1. In addition, the charges generated by the first photoelectric element LPD and the second photoelectric element RPD may be stored in the first floating diffusion FD1. In this case, since the reset transistor RX2 is turned off, the reset transistor RX1 may have the sixth potential OFF3.

Thereafter, the boosting control signal FD_BST of a low level may transition to a high level. The boosting control signal FD_BST of a high level is applied to the second floating diffusion FD2, so that the second floating diffusion FD2 may have the third potential V3. In addition, the first transmission signal TG_L of the high level and the second transmission signal TG_R of the high level are applied to the gates of the transmission transistors TX11, TX12, TX21, TX22, TX31, TX32, TX41, and TX42, so that the charges not transferred to the first floating diffusion FD1 among the charges generated by the photoelectric elements PD_L1, PD_R1, PD_L2, PD_R2, PD_L3, PD_R3, PD_L4, and PD_R4, that is, the first photoelectric element LPD and the second photoelectric element RPD, may be provided to the first floating diffusion FD1 and the second floating diffusion FD2. Specifically, the charge generated by the first photoelectric element LPD may be transferred to the first floating diffusion FD1 and the second floating diffusion FD2 through the channel areas of the transmission transistors TX11, TX21, TX31, and TX41, and the charge generated by the second photoelectric element RPD may be transferred to the first floating diffusion FD1 and the second floating diffusion FD2 through the channel areas of the transmission transistors TX12, TX22, TX32, and TX42. Accordingly, the charges stored in the first floating diffusion FD1 and the second floating diffusion FD2 may be changed.

During the period T59, the voltage of the floating node FN2 according to the charge stored in the first floating diffusion FD1 and the second floating diffusion FD2 may be outputted to the column line CL as the pixel signal VS, that is, the second LCG signal SIG_L2 through the driving transistor DX. The second LCG signal SIG_L2 be a pixel signal according to the charge accumulated in the first floating diffusion FD1 and the second floating diffusion FD2, among the charges generated by the photoelectric elements PD_L1, PD_L2, PD_L3, and PD_L4 positioned at the left sides of respective sub-pixels SP1, SP2, SP3, and SP4 in the pixel PX3 and the charges generated by the photoelectric elements PD_R1, PD_R2, PD_R3, and PD_R4 positioned at the right sides of respective sub-pixels SP1, SP2, SP3, and SP4 in the pixel PX3. That is, the second LCG signal SIG_L2 may be a signal obtained by adding the left phase signal and the right phase signal when the image sensor 100 operates in the LCG mode.

Since the transmission transistor TX is turned off, the transmission transistor TX may have the second potential OFF1. The charges generated by the first photoelectric element LPD and the second photoelectric element RPD may be stored in the first floating diffusion FD1 and the second floating diffusion FD2. Since the reset transistor RX2 is turned off, the reset transistor RX2 may have the sixth potential OFF3.

The readout circuit 150 may perform auto-focusing by using the first HCG signal SIG_H1, the first LCG signal SIG_L1, the second HCG signal SIG_H2, and the second LCG signal SIG_L2 that are read during the readout period (READOUT). For example, the readout circuit 150 may obtain a right phase signal when the image sensor 100 operates in the HCG mode by subtracting the first HCG signal SIG_H1 from the second HCG signal SIG_H2. In addition, the readout circuit 150 may obtain a right phase signal when the image sensor 100 operates in the LCG mode by subtracting the first LCG signal SIG_L1 from the second LCG signal SIG_L2.

Auto-focusing using the pixel signal VS read by the method according to FIG. 17 uses the actual left phase signal when operating in the LCG mode, so that more accurate auto-focusing may be performed.

Figure 18:
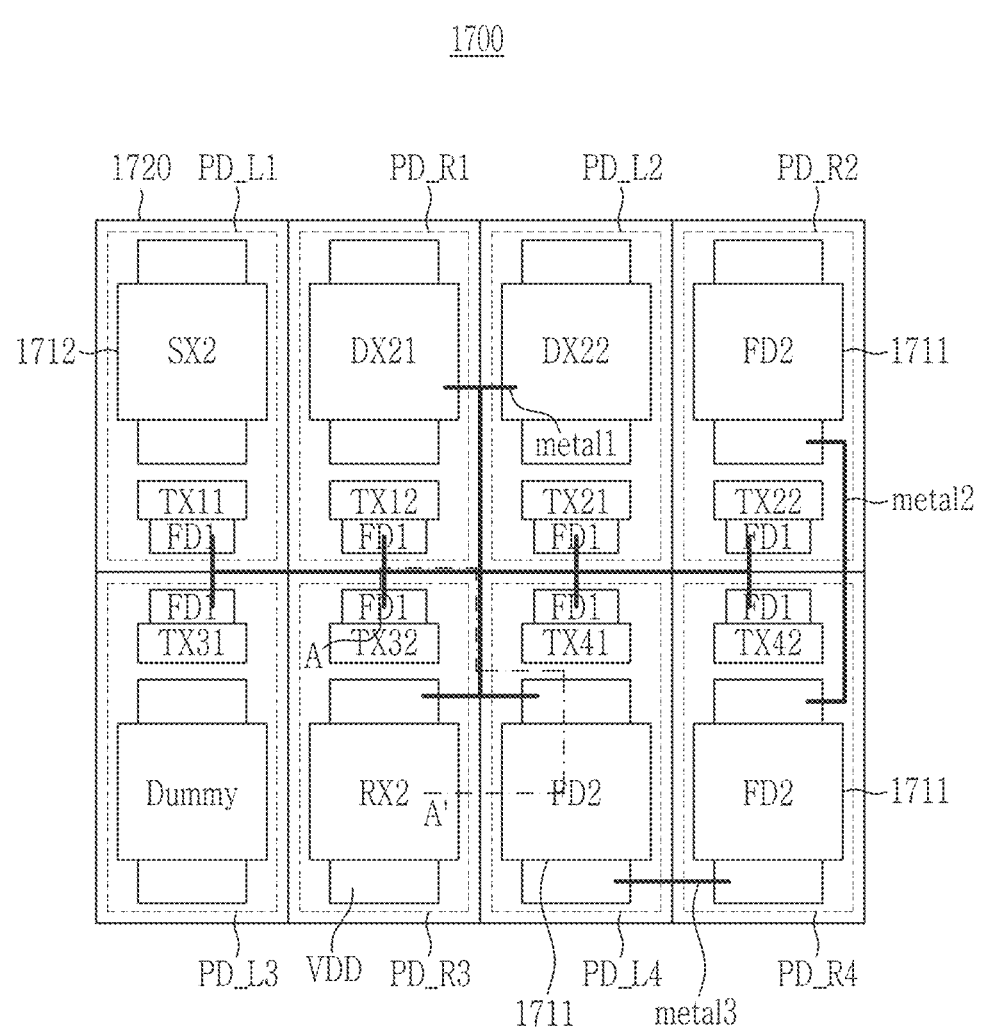
FIG. 18 illustrates an actual layout of the pixel according to FIG. 13.

FIG. 18 illustrates an actual layout of the pixel according to FIG. 13.

Referring to FIG. 18, a pixel layout 1700 shows a disposition state of respective elements included in the pixel PX3 shown in FIG. 13.

Referring to FIG. 18, one pixel 1700 may include photoelectric element areas PD_L1, PD_R1, PD_L2, PD_R2, PD_L3, PD_R3, PD_L4, and PD_R4, transmission transistor areas TX11, TX12, TX21, TX22, TX31, TX32, TX41, and TX42, a first floating diffusion area FD1, a reset transistor area RX2, driving transistor areas DX21 and DX22, a selection transistor area SX2, and a second floating diffusion area FD2. Each of the photoelectric element areas is indicated by a dotted line.

In some example embodiments, the pixel 1700 may be formed by a DTI process to prevent or hinder electrical and optical crosstalk between adjacent pixels. In FIG. 18, a DTI area 1720 may be formed at an edge of an active area for electrical or optical separation from the active area (indicated by a dotted line) of other adjacent photoelectric elements PD_L1, PD_R1, PD_L2, PD_R2, PD_L3, PD_R3, PD_L4, and PD_R4.

The photoelectric element areas PD_L1, PD_R1, PD_L2, PD_R2, PD_L3, PD_R3, PD_L4, and PD_R4 may be formed under respective transistors.

Each of (or alternatively, at least one of) the transmission transistor areas TX11, TX12, TX21, TX22, TX31, TX32, TX41, and TX42 may have a vertical gate structure extending in a depth direction from a first surface defined as an upper surface of the pixel 1700. That is, each of (or alternatively, or at least one of) the transmission transistor areas TX11, TX12, TX21, TX22, TX31, TX32, TX41, and TX42 may extend in a depth direction perpendicular to the upper surface of the pixel 1700, and may be adjacent to each of (or alternatively, at least one of) the photoelectric elements PD_L1, PD_R1, PD_L2, PD_R2, PD_L3, PD_R3, PD_L4, and PD_R4 that are disposed at lower portions of the transmission transistor areas TX11, TX12, TX21, TX22, TX31, TX32, TX41, and TX42. A gate of the transmission transistor may receive a transmission signal TG. The gate of the transmission transistor may be formed of (or alternatively, include) polysilicon.

The first floating diffusion area FD1 may be formed to be adjacent to the gate of each transmission transistor. The first floating diffusion area FD1 may be a node in which photocharges accumulated in the photoelectric element are transferred and accumulated through the transmission transistor. A plurality of first floating diffusion areas FD1 may all be connected through a first metal wire (metal1).

Gates of the driving transistors DX21 and DX22 may be connected to the first floating diffusion area FD1 through the first metal wire (metal1). A voltage according to the charge accumulated in the first floating diffusion area FD1 may be applied to the gate of the driving transistor 1705. The gate of the driving transistor 1705 may be connected to the reset transistor area RX2.

The reset transistor area RX2 may be connected to the second floating diffusion area FD2. A reset signal may be applied to a gate of the reset transistor area RX2. In addition, the power voltage area VDD may be positioned under the reset transistor area RX2.

A plurality of second floating diffusion areas FD2 may be connected to each other through a second metal wire (metal2) and a third metal wire (metal3).

The second floating diffusion area FD2 may be formed in a silicon layer. The second floating diffusion area FD2 may include a silicon layer, and an electrode 1711 on the silicon layer. The electrode 1711 may be formed of (or alternatively, include) polysilicon. In the second floating diffusion area FD2, the electrode 1711 and the silicon layer may be insulated by an insulation layer. The boosting control signal FD_BST may be applied to the electrode 1711.

Meanwhile, a dummy area (Dummy) may be an area filling a space between transistors in order to equalize a process density when designing a layout of a circuit block. However, the dummy area (Dummy) does not play any role in the pixel 1700 and may not include any active element such as a MOS transistor therein. Accordingly, the dummy area (Dummy) may not contact the metal wires.

Figure 19:
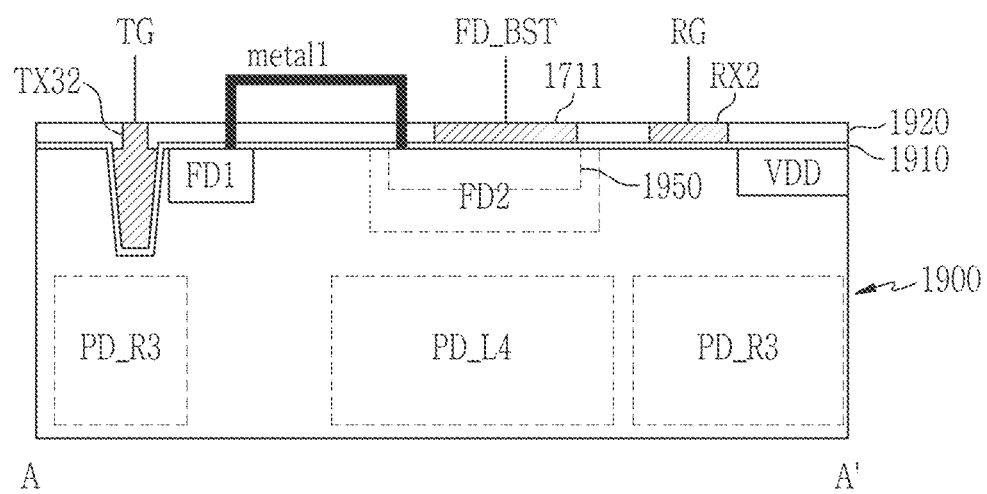
FIG. 19 illustrates a cross-sectional view taken along line A-A' of FIG. 18.

FIG. 19 illustrates a cross-sectional view taken along line A-A' of FIG. 18.

As shown in FIG. 19, a substrate 1900 may include a photoelectric element area PD_R3, a first floating diffusion area FD1, a second floating diffusion area FD2, and a power voltage area VDD. A substrate 1900 may be formed of (or alternatively, include) polysilicon.

In addition, a first oxide layer 1910 and a second oxide layer 1920 may be formed on the substrate 1900. The oxide layer 1920 may include the gates of the transmission transistor area TX32, the electrode 1711, and the reset transistor area RX2.

The photoelectric element area PD_R3 may be positioned on the substrate 1900 positioned below the transmission transistor area TX32. In addition, the first floating diffusion area FD1 may be positioned adjacent to the transmission transistor area TX32. When the transmission signal TG is applied to the gate of the transmission transistor area TX32, the photo-charge accumulated in the photoelectric element area PD_R3 may be transferred to the first floating diffusion area FD1 through the transmission transistor area TX32. In some example embodiments, the photoelectric element area PD_R3 may not be positioned below the transmission transistor area TX32, and the photoelectric element area PD_R3 may be positioned in an arbitrary area in which photo-charges may be transferred to the first floating diffusion area FD1 through the transmission transistor area TX32.

The first metal wire (metal1) may be connected to the upper portions of the first floating diffusion area FD1 and the second floating diffusion area FD2. The photo-charge accumulated in the first floating diffusion area FD1 may be transferred to the second floating diffusion area FD2 through the first metal wire (metal1). In some example embodiments, the first floating diffusion area FD1 may include a well area and a dielectric film for accumulating photo-charges. The well area may be formed of (or alternatively, include) a p-type silicon.

Meanwhile, the electrode 1711 may be positioned on the second oxide layer 1920 positioned at the upper portion of the second floating diffusion area FD2. The boosting control signal FD_BST may be applied to the second floating diffusion area FD2 through the electrode 1711 and the first oxide layer 1910. The substrate 1900 may act as a well area of the second floating diffusion area FD2. In some example embodiments, the polysilicon of the substrate 1900 may serve as a well area of a capacitor.

As the boosting control signal FD_BST is applied to the second floating diffusion area FD2 through the electrode 1711, more charges may be accumulated in a portion 1950 of the floating diffusion area FD2 than in other portions of the floating diffusion area FD2. The portion 1950 of the floating diffusion area FD2 may function as or be configured as the boosting area 650 in FIG. 6 and the boosting area 1350 in FIG. 13.

The photoelectric element area PD_L4 may be positioned on the substrate 1900 positioned below the second floating diffusion area FD2.

The reset transistor area RX2 may be positioned on the second oxide layer 1920 between the second floating diffusion area FD2 and the power voltage area VDD. When the reset signal RG is applied to the gate of the reset transistor area RX2, the power voltage area VDD and the second floating diffusion area FD2 may be connected. Accordingly, the photo-charge accumulated in the second floating diffusion area FD2 may be reset to the pixel voltage.

The photoelectric element area PD_R3 may be positioned on the substrate 1900 positioned below the reset transistor area RX2 and the power voltage area VDD. The photoelectric element area PD_R3 may be positioned to be adjacent to the photoelectric element area PD_L4.

Figure 20:
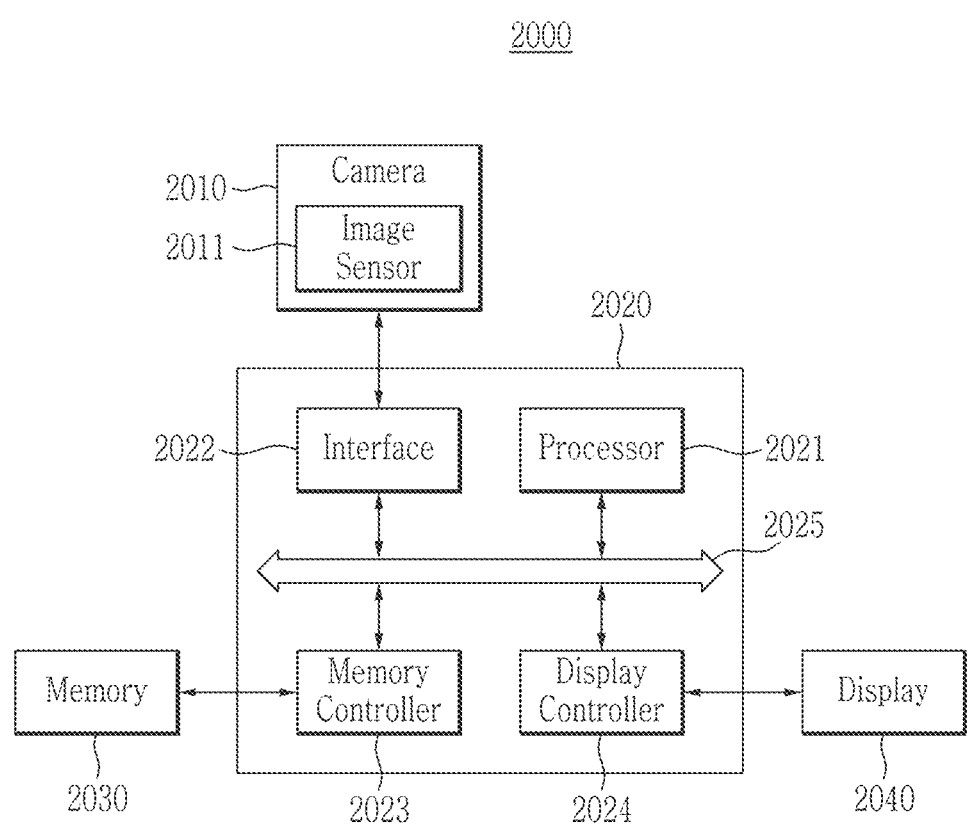
FIG. 20 illustrates a block diagram of a computing device according to an example embodiment.

FIG. 20 illustrates a block diagram of a computing device according to an example embodiment.

Referring to FIG. 20, a computing device 2000 may include a camera 2010, a controller 2020, a memory 2030, and a display 2040.

The camera 2010 may include an image sensor 2011. The image sensor 2011 may be implemented as the image sensor described with reference to FIG. 1 to FIG. 19. The camera 2010 may generate an image signal by using the image sensor 2011, may perform image signal processing on the image signal, and may output the processed image signal to the controller 2020.

The controller 2020 may include a processor 2021. The processor 2021 may control an overall operation of each constituent element of the computing device 2000. The processor 2021 may be implemented as at least one of various processing units such as a central processing unit (CPU), an application processor (AP), and a graphics processing unit (GPU). In some example embodiments, the controller 2020 may be implemented as an integrated circuit or a system on chip (SoC).

In some example embodiments, as shown in FIG. 20, the controller 2020 may further include an interface 2022, a memory controller 2023, a display controller 2024, and a bus 2025. In some example embodiments, at least some of the interface 2022, the memory controller 2023, the display controller 2024, and the bus 2025 may be provided outside the controller 2020. In some example embodiments, the controller 2020 may further include an image signal processor.

The interface 2022 may transmit an image signal received from the image sensor 2011 to the memory controller 2023 or the display controller 2024 through the bus 2025.

The memory 2030 may store various data and instructions. The memory controller 2023 may control transmission of data or instructions to and from the memory 2030.

The display controller 2024 may transmit data to be displayed on the display 2040 to the display 2040 under control of the processor 2021, and the display 2040 may display a screen according to the received data. In some example embodiments, the display 2040 may further include a touch screen. The touch screen may transmit a user input capable of controlling an operation of the computing device 2000 to the controller 2020. The user input may be generated when a user touches the touch screen.

The bus 2025 may provide a communication function between constituent elements of the controller 2020. The bus 2025 may include at least one type of bus according to a communication protocol between the constituent elements.

While this invention has been described in connection with what is presently considered to be practical example embodiments, it is to be understood that the invention is not limited to the disclosed example embodiments, but, on the contrary, is intended to cover various modifications and equivalent arrangements included within the spirit and scope of the appended claims.

What is claimed is:

1. An image sensor comprising:
   a pixel array including a first floating diffusion and a second floating diffusion, the first floating diffusion and the second floating diffusion configured to store charges generated by a first phase detecting pixel and a second phase detecting pixel, the first phase detecting pixel and the second phase detecting pixel adjacent to each other in a first direction and covered with one micro lens, and the pixel array is configured to output a first signal based on a charge that is generated by the first phase detecting pixel to be accumulated in the first floating diffusion and the second floating diffusion; and
   a row driver configured to apply a boosting control signal to the second floating diffusion to transfer charges stored in the second floating diffusion to the first floating diffusion, after the pixel array outputs the first signal.

2. The image sensor of claim 1, wherein
   the second floating diffusion includes a silicon layer, and an electrode positioned on the silicon layer, and
   the electrode is configured to have the boosting control signal applied thereto.

3. The image sensor of claim 1, wherein
   after the row driver applies the boosting control signal, the pixel array is configured to output a second signal based on charges generated by the first phase detecting pixel and the second phase detecting pixel accumulated in the first floating diffusion.

4. The image sensor of claim 3, wherein
   before the first signal is outputted, the pixel array is configured to output a third signal based on a charge that is generated by the first phase detecting pixel to be accumulated in the first floating diffusion.

5. The image sensor of claim 4, wherein
   after the second signal is outputted, the pixel array is configured to output a fourth signal based on charges that are generated by the first phase detecting pixel and the second phase detecting pixel to be accumulated in the first floating diffusion and the second floating diffusion.

6. The image sensor of claim 2, wherein
   the pixel array further includes a switch transistor connected between the first floating diffusion and the second floating diffusion, and the row driver is configured to control the switch transistor such that the boosting control signal is applied to the second floating diffusion while the switch transistor is turned on after the pixel array outputs the first signal.

7. The image sensor of claim 6, wherein
   the row driver is configured to apply the boosting control signal to the second floating diffusion while the pixel array outputs a second signal.

8. A pixel comprising:
   a first phase detecting pixel connected to a first node;
   a second phase detecting pixel connected to a first node and disposed adjacent to the first phase detecting pixel;
   a first floating diffusion configured to determine a voltage of the first node based on charges generated by the first phase detecting pixel and the second phase detecting pixel;
   a second floating diffusion connected to the first node; and
   a driving transistor configured to receive a control signal such that the driving transistor sequentially outputs a first signal based on a charge generated by the first phase detecting pixel to be accumulated in the first floating diffusion, a second signal based on a charge generated by the first phase detecting pixel to be accumulated in the first floating diffusion and the second floating diffusion, and a third signal based on charges generated by the first phase detecting pixel and the second phase detecting pixel to be accumulated in the first floating diffusion.

9. The pixel of claim 8, wherein
   the second floating diffusion includes a silicon layer, and an electrode that is positioned on the silicon layer and
   the electrode is configured to have a boosting control signal applied thereto.

10. The pixel of claim 9, wherein
    the second floating diffusion is configured to receive the boosting control signal to transfer a charge stored in the second floating diffusion to the first floating diffusion after the driving transistor outputs the second signal.

11. The pixel of claim 10, wherein
    the driving transistor is configured to receive the control signal such that the driving transistor outputs the third signal after the boosting control signal is applied.

12. The pixel of claim 8, wherein
    the driving transistor is configured to receive the control signal such that, after the third signal is outputted, the driving transistor further outputs a fourth signal based on charges that are generated by the first phase detecting pixel and the second phase detecting pixel to be accumulated in the first floating diffusion and the second floating diffusion.

13. The pixel of claim 9, further comprising
    a switch transistor connected between the first floating diffusion and the second floating diffusion,
    wherein the second floating diffusion is configured to receive the boosting control signal to transfer a charge stored in the second floating diffusion to the first floating diffusion while the switch transistor is turned on after the driving transistor outputs the second signal.

14. The pixel of claim 13, wherein
    the second floating diffusion is configured to receive the boosting control signal while the third signal is output.

15. The pixel of claim 14, wherein
    the driving transistor is configured to receive the control signal such that, after the third signal is outputted, the driving transistor further outputs a fourth signal based on charges that are generated by the first phase detecting pixel and the second phase detecting pixel to be accumulated in the first floating diffusion and the second floating diffusion.

16. An image sensor comprising:
a semiconductor substrate in which a plurality of pixel areas are defined;
a first photoelectric element provided inside the semiconductor substrate in each of the plurality of pixel areas, and a second photoelectric element adjacent to the first photoelectric element;
a first transmission transistor having a transmission gate electrode having at least a partial area buried in the semiconductor substrate and the transmission gate electrode extending in a direction perpendicular to the first photoelectric element;
a second transmission transistor having a transmission gate electrode having at least a partial area buried in the semiconductor substrate to extend in a direction perpendicular to the second photoelectric element;
a first floating diffusion configured to accumulate charges transferred from the first photoelectric element and the second photoelectric element via the first transmission transistor and the second transmission transistor;
a second floating diffusion including a silicon layer, and an electrode positioned on the silicon layer and configured to receive a boosting control signal, and transfer charges transferred from the first photoelectric element and the second photoelectric element to the first floating diffusion in response to the boosting control signal being applied.

17. The image sensor of claim 16, wherein
the second floating diffusion includes a contact that is positioned on the silicon layer and is connected to a wire connected to the first floating diffusion.

18. The image sensor of claim 16, wherein
the first floating diffusion is positioned in an area in which the silicon layer of the second floating diffusion extends.

19. The image sensor of claim 18, further comprising
a switch transistor positioned between the first floating diffusion and the second floating diffusion.

20. The image sensor of claim 16, wherein
the semiconductor substrate includes polysilicon,
the first floating diffusion includes a p-type of well area, and the second floating diffusion includes a well area, and the well area includes the polysilicon.

* * * * *